US012652410B2

(12) United States Patent
Shi et al.

(10) Patent No.: US 12,652,410 B2
(45) Date of Patent: Jun. 9, 2026

(54) ENCODING METHOD AND APPARATUS, STORAGE MEDIUM, AND COMPUTER PROGRAM PRODUCT

(71) Applicant: Huawei Technologies Co., Ltd., Shenzhen (CN)

(72) Inventors: Yibo Shi, Beijing (CN); Jing Wang, Beijing (CN); Yunying Ge, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/899,403

(22) Filed: Sep. 27, 2024

(65) Prior Publication Data

US 2025/0024064 A1    Jan. 16, 2025

Related U.S. Application Data

(63) Continuation of application No. PCT/CN2023/076925, filed on Feb. 17, 2023.

(30) Foreign Application Priority Data

Mar. 31, 2022    (CN) .......................... 202210345172.7

(51) Int. Cl.
| | |
|---|---|
| *H04N 19/51* | (2014.01) |
| *G06N 3/08* | (2023.01) |
| *H04N 19/137* | (2014.01) |
| *H04N 19/172* | (2014.01) |
| *H04N 19/61* | (2014.01) |

(52) U.S. Cl.
CPC .......... *H04N 19/51* (2014.11); *H04N 19/137* (2014.11); *H04N 19/172* (2014.11); *H04N 19/61* (2014.11); *G06N 3/08* (2013.01)

(58) Field of Classification Search
CPC .... H04N 19/51; H04N 19/137; H04N 19/172; H04N 19/61; G06N 3/08
USPC ...................................................... 375/240.12
See application file for complete search history.

(56) References Cited

U.S. PATENT DOCUMENTS

| | | | | |
|---|---|---|---|---|
| 12,113,966 B2 * | 10/2024 | Xu | ........................ | H04N 19/176 |
| 2013/0128973 A1 * | 5/2013 | Han | ........................ | H04N 19/43 |
| | | | | 375/240.12 |
| 2020/0053372 A1 * | 2/2020 | Xu | ........................ | H04N 19/513 |
| 2020/0084427 A1 * | 3/2020 | Sun | ........................ | G06N 3/045 |
| 2020/0120340 A1 * | 4/2020 | Park | ........................ | H04N 19/105 |
| 2022/0272361 A1 * | 8/2022 | Moon | .................. | H04N 19/196 |
| 2023/0254501 A1 * | 8/2023 | Xiu | ........................ | H04N 19/513 |
| | | | | 375/240.16 |

OTHER PUBLICATIONS

Guo Lu, DVC: An End-to-end Deep Video Compression Framework, arXiv:1812.00101, Nov. 30, 2018, total 14 pages.

(Continued)

*Primary Examiner* — Justin W Rider
(74) *Attorney, Agent, or Firm* — Conley Rose, P.C.

(57) ABSTRACT

A method includes determining a current feature and a reference feature. The current feature is of a to-be-encoded current image, and the reference feature is of a reference image of the to-be-encoded current image. A correlation matrix of the reference feature relative to the current feature is determined, and an inter motion feature is determined based on the correlation matrix. The inter motion feature is encoded into a bitstream.

20 Claims, 12 Drawing Sheets

(56)     References Cited

OTHER PUBLICATIONS

Zhihao Hu, FVC: A New Framework towards Deep Video Compression in Feature Space, 2021 IEEE/CVF Conference on Computer Vision and Pattern Recognition (CVPR), Jun. 20-25, 2021, total 10 pages.

Xiaolin Song et al: "FPCR-Net: Feature Pyramidal Correlation and Residual Reconstruction for Semi-supervised Optical Flow Estimation", arxiv.org, Cornell University Library, 201 Olin Library Cornell University Ithaca, NY 14853, Jan. 17, 2020, XP081580716, total 8 pages.

Dosovitskiy Alexey et al: "FlowNet: Learning Optical Flow with Convolutional Networks", 2015 IEEE International Conference on Computer Vision (ICCV), IEEE, Dec. 7, 2015, XP032866621, total 9 pages.

* cited by examiner

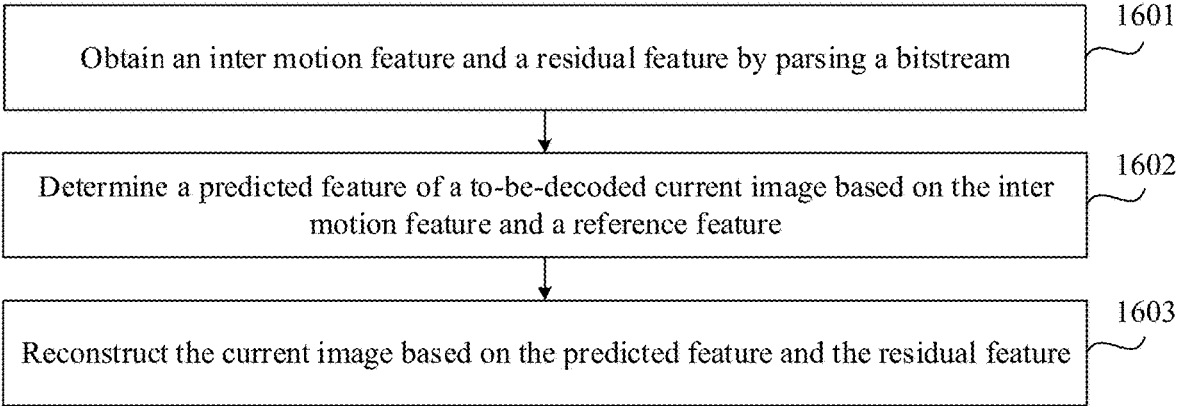

Obtain an inter motion feature and a residual feature by parsing a bitstream    1601

Determine a predicted feature of a to-be-decoded current image based on the inter motion feature and a reference feature    1602

Reconstruct the current image based on the predicted feature and the residual feature    1603

FIG. 16

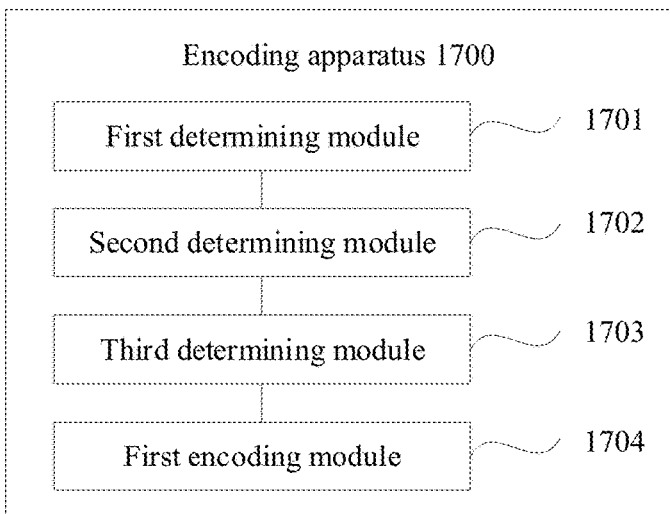

Encoding apparatus 1700

First determining module    1701

Second determining module    1702

Third determining module    1703

First encoding module    1704

FIG. 17

ENCODING METHOD AND APPARATUS, STORAGE MEDIUM, AND COMPUTER PROGRAM PRODUCT

CROSS-REFERENCE TO RELATED APPLICATIONS

This is a continuation of International Patent Application No. PCT/CN2023/076925 filed on Feb. 17, 2023, which claims priority to Chinese Patent Application No. 202210345172.7 filed on Mar. 31, 2022. The disclosures of the aforementioned applications are hereby incorporated by reference in their entireties.

TECHNICAL FIELD

This disclosure relates to the field of data compression technologies, and in particular, to an encoding method and apparatus, a storage medium, and a computer program product.

BACKGROUND

Video coding can reduce pressure of occupation of network bandwidth by video storage and video transmission. Video coding is also referred to as video compression. An essence of video coding is to remove redundant information from a video, to use less data (video bitstream) to represent an original video. Video coding includes intra prediction coding and inter prediction coding. Intra prediction coding does not need to use a reference frame, and inter prediction coding needs to use a current frame and a reference frame to determine inter motion information, and use the inter motion information to compress a video. A key of video coding is how to use the inter motion information more effectively. Therefore, current researches related to video coding increasingly focus on inter prediction coding. However, in some current inter prediction coding schemes, prediction accuracy of inter motion information is low.

SUMMARY

Embodiments of this disclosure provide an encoding method and apparatus, a storage medium, and a computer program product, to improve prediction accuracy of inter motion information and further improve compression performance. The technical solutions are as follows.

According to a first aspect, an encoding method is provided, and the method includes: determining a current feature and a reference feature, where the current feature is a feature of a to-be-encoded current image, and the reference feature is a feature of a reference image of the current image; determining a correlation matrix of the reference feature relative to the current feature; determining an inter motion feature based on the correlation matrix; and encoding the inter motion feature into a bitstream.

In this solution, the correlation matrix is introduced to fit inter motion. Because the correlation matrix can represent a part with strong correlation and a part with weak correlation between the current feature and the reference feature, and inter motion information corresponding to the part with strong correlation is richer, in a process of fitting the inter motion, inter motion corresponding to the part with strong correlation can be better fitted based on a size of each element in the correlation matrix, and less attention is paid to inter motion corresponding to the part with weak correlation. Simply speaking, the correlation matrix has an information enhancement function for prediction of the inter motion feature, and can improve prediction accuracy of the inter motion feature and further improve compression performance.

Optionally, the determining an inter motion feature based on the correlation matrix includes: inputting the correlation matrix into a motion encoding network to obtain the inter motion feature; or inputting the correlation matrix, the current feature, and the reference feature into a motion encoding network to obtain the inter motion feature; or inputting the correlation matrix, the current image, and the reference image into a motion encoding network to obtain the inter motion feature.

It should be understood that, in this implementation of this disclosure, an encoder side may directly input the correlation matrix into the motion encoding network to obtain the inter motion feature, or may obtain the inter motion feature by using the reference feature and the current feature of feature space in combination with the correlation matrix, or may obtain the inter motion feature by using the reference image and the current image of image space in combination with the correlation matrix.

Optionally, the determining an inter motion feature based on the correlation matrix includes: using the reference feature as a predicted feature, and inputting the correlation matrix, the predicted feature, and the current feature into a motion encoding network to obtain a motion feature; and determining a quantity of iterations; if the quantity of iterations is less than an iteration quantity threshold, inputting the motion feature into a motion decoding network to obtain a reconstructed motion feature, transforming the reference feature based on the reconstructed motion feature to re-determine the predicted feature, re-determining a correlation matrix of the predicted feature relative to the current feature, and returning to perform the step of inputting the correlation matrix, the predicted feature, and the current feature into the motion encoding network to obtain the motion feature; and if the quantity of iterations is equal to the iteration quantity threshold, determining the motion feature as the inter motion feature.

It should be understood that, in this implementation of iterative processing, the encoder side improves prediction accuracy of the inter motion feature through a plurality of iterations. In other words, details of the motion feature are enriched by iteratively updating the motion feature.

Optionally, after the determining an inter motion feature based on the correlation matrix, the method further includes: determining a residual feature based on the inter motion feature; and encoding the residual feature into the bitstream. It should be understood that, for inter prediction coding, in addition to determining and encoding the inter motion feature, the encoder side further determines the residual feature and encodes the residual feature, so that the decoder side decompresses a video based on the inter motion feature and the residual feature.

Optionally, the determining a residual feature based on the inter motion feature includes: inputting the inter motion feature into the motion decoding network to obtain the reconstructed motion feature between the current image and the reference image; transforming the reference feature based on the reconstructed motion feature between the current image and the reference image to obtain the predicted feature of the current image; determining a first residual, where the first residual is a residual between the predicted feature of the current image and the current feature; and inputting the first residual into a residual encoding network to obtain the residual feature. It should be understood that, in this implementation, the encoder side performs transformation and prediction in the feature space.

Optionally, the determining a residual feature based on the inter motion feature includes: inputting the inter motion feature into the motion decoding network to obtain the reconstructed motion feature between the current image and the reference image; transforming the reference image based on the reconstructed motion feature between the current image and the reference image to obtain a predicted image; determining a second residual, where the second residual is a residual between the predicted image and the current image; and inputting the second residual into a residual encoding network to obtain the residual feature. It should be understood that, in this implementation, the encoder side performs transformation and prediction in the image space.

Optionally, the reference image is a reconstructed image of a reference frame.

According to a second aspect, an encoding apparatus is provided. The encoding apparatus has a function of implementing behavior in the encoding method in the first aspect. The encoding apparatus includes one or more modules, and the one or more modules are configured to implement the encoding method provided in the first aspect.

To be specific, an encoding apparatus is provided, and the apparatus includes: a first determining module, configured to determine a current feature and a reference feature, where the current feature is a feature of a to-be-encoded current image, and the reference feature is a feature of a reference image of the current image; a second determining module, configured to determine a correlation matrix of the reference feature relative to the current feature; a third determining module, configured to determine an inter motion feature based on the correlation matrix; and a first encoding module, configured to encode the inter motion feature into a bitstream.

Optionally, the third determining module is configured to: input the correlation matrix into a motion encoding network to obtain the inter motion feature; or input the correlation matrix, the current feature, and the reference feature into a motion encoding network to obtain the inter motion feature; or input the correlation matrix, the current image, and the reference image into a motion encoding network to obtain the inter motion feature.

Optionally, the third determining module is configured to: use the reference feature as a predicted feature, and input the correlation matrix, the predicted feature, and the current feature into a motion encoding network to obtain a motion feature; determine a quantity of iterations; if the quantity of iterations is less than an iteration quantity threshold, input the motion feature into a motion decoding network to obtain a reconstructed motion feature, transform the reference feature based on the reconstructed motion feature to re-determine the predicted feature, re-determine a correlation matrix of the predicted feature relative to the current feature, and return to perform the step of inputting the correlation matrix, the predicted feature, and the current feature into the motion encoding network to obtain the motion feature; and if the quantity of iterations is equal to the iteration quantity threshold, determine the motion feature as the inter motion feature.

Optionally, the apparatus further includes: a fourth determining module, configured to determine a residual feature based on the inter motion feature; and a second encoding module, configured to encode the residual feature into the bitstream.

Optionally, the fourth determining module is configured to: input the inter motion feature into the motion decoding network to obtain the reconstructed motion feature between the current image and the reference image; transform the reference feature based on the reconstructed motion feature between the current image and the reference image to obtain the predicted feature of the current image; determine a first residual, where the first residual is a residual between the predicted feature of the current image and the current feature; and input the first residual into a residual encoding network to obtain the residual feature.

Optionally, the fourth determining module is configured to: input the inter motion feature into the motion decoding network to obtain the reconstructed motion feature between the current image and the reference image; transform the reference image based on the reconstructed motion feature between the current image and the reference image to obtain a predicted image; determine a second residual, where the second residual is a residual between the predicted image and the current image; and input the second residual into the residual encoding network to obtain the residual feature.

Optionally, the reference image is a reconstructed image of a reference frame.

According to a third aspect, an encoding apparatus is provided, and the encoding apparatus includes a processor and an interface circuit. The processor receives and/or sends data by using the interface circuit, and the processor is configured to invoke program instructions stored in a memory, to perform the encoding method provided in the first aspect.

Optionally, the encoding apparatus includes the memory. In an implementation process of this disclosure, the processor is configured to determine a current feature and a reference feature, where the current feature is a feature of a to-be-encoded current image, and the reference feature is a feature of a reference image of the current image; and the processor is further configured to determine a correlation matrix of the reference feature relative to the current feature, determine an inter motion feature based on the correlation matrix, and encode the inter motion feature into a bitstream.

According to a fourth aspect, a computer device is provided, and the computer device includes a processor and a memory. The memory is configured to store a program for performing the encoding method provided in the first aspect, and store data used to implement the encoding method provided in the first aspect. The processor is configured to execute the program stored in the memory. The computer device may further include a communication bus, and the communication bus is configured to establish a connection between the processor and the memory.

According to a fifth aspect, a computer-readable storage medium is provided. The computer-readable storage medium stores instructions. When the instructions are run on a computer, the computer performs the encoding method according to the first aspect.

According to a sixth aspect, a computer program product including instructions is provided. When the computer program product is run on a computer, the computer performs the encoding method according to the first aspect.

Technical effect achieved in the second aspect, the third aspect, the fourth aspect, the fifth aspect, and the sixth aspect are similar to technical effect achieved by corresponding technical means in the first aspect. Details are not described herein again.

BRIEF DESCRIPTION OF DRAWINGS

FIG. 16 is a flowchart of a decoding method according to an embodiment of this disclosure.

FIG. 17 is a diagram of a structure of an encoding apparatus according to an embodiment of this disclosure.

DESCRIPTION OF EMBODIMENTS

Figure 1:
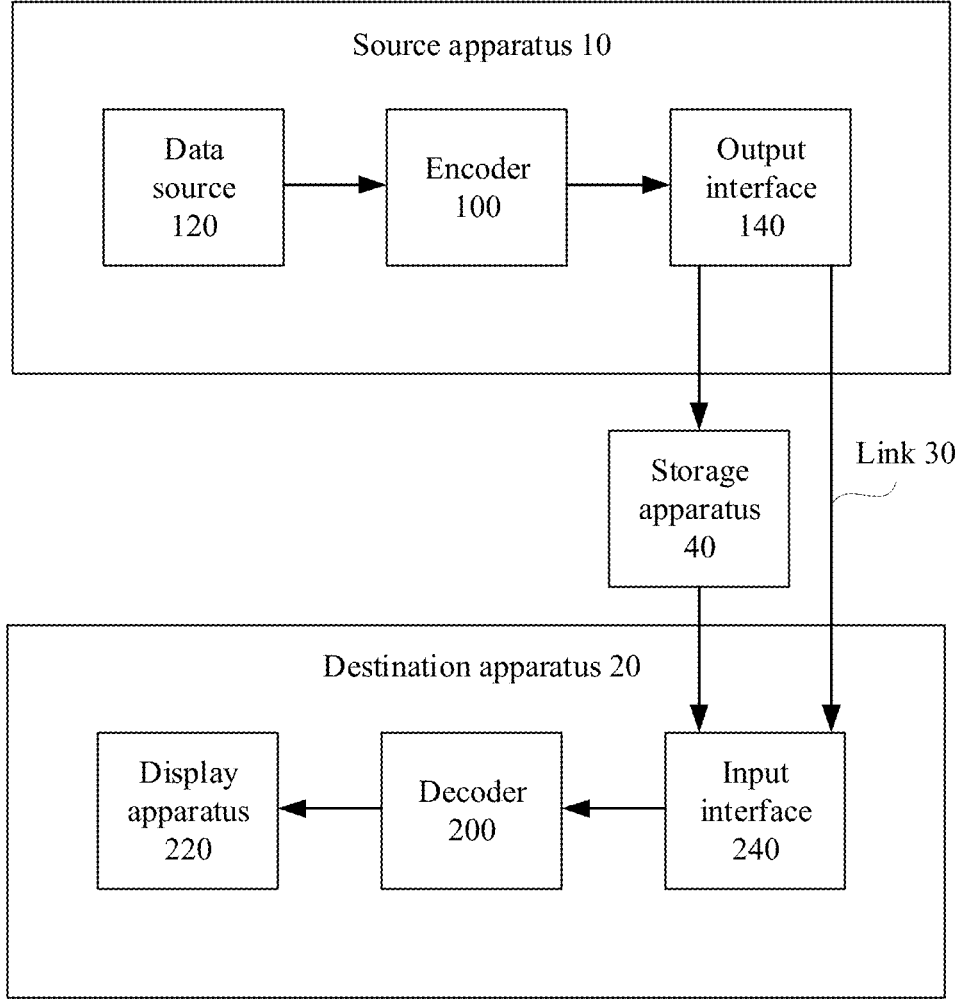
FIG. 1 is a diagram of an implementation environment according to an embodiment of this disclosure.

To make objectives, technical solutions, and advantages of this disclosure clearer, the following further describes implementations of this disclosure in detail with reference to the accompanying drawings.

A system architecture and a service scenario that are described in embodiments of this disclosure are intended to describe technical solutions in embodiments of this disclosure more clearly, and do not constitute a limitation on the technical solutions provided in embodiments of this disclosure. A person of ordinary skill in the art may be aware that, with evolution of the system architecture and emergence of a new service scenario, the technical solutions provided in embodiments of this disclosure are also applicable to similar technical problems.

Before an encoding/decoding method provided in embodiments of this disclosure is described in detail, terms and implementation environments in embodiments of this disclosure are first described.

For ease of understanding, some terms and related technologies in embodiments of this disclosure are first explained.

A pixel depth (bits per pixel (BPP)) is also referred to as bit/pixel. BPP is a quantity of bits used to store each pixel. A smaller BPP indicates a smaller compression bit rate.

Bit rate: In image compression, a bit rate refers to an encoding length required for encoding a unit pixel. A higher bit rate indicates better image reconstruction quality.

A peak signal-to-noise ratio (PSNR) is an objective standard for evaluating image quality. A higher PSNR indicates better image quality.

Multi-scale structural similarity index measure (MS-SSIM) is an objective standard for evaluating an image. A higher MS-SSIM indicates better image quality.

Artificial intelligence (AI) is technical science that studies and develops a theory, a method, a technology, and an application system for simulating, extending, and expanding human intelligence.

Convolutional neural network (CNN) is a feedforward neural network that includes convolutional computing and has a deep structure and is one of representative algorithms of deep learning.

Group of pictures (GOP): A bitstream of a video includes a plurality of GOPs. A GOP is a group of continuous pictures, includes an I frame, a P frame, and/or a B frame, and is a basic unit for a video image encoder and a video image decoder to access.

An I frame is an intra-coded frame, and is also referred to as a key frame. The I frame is compressed and generated without referring to other pictures. The I frame describes details of an image background and a motion subject. During decoding, a complete image can be reconstructed using only data of the I frame. The I frame is generally a first frame of each GOP and is used as a reference frame for random access.

A P frame is a forward predictive-coded frame, and is also referred to as a forward prediction frame (a forward reference frame). The P frame indicates a difference between this frame and a previous key frame (or P frame). The P frame transmits, by using a motion compensation method, a prediction error and a motion vector between the P frame and a previous I frame or P frame. During decoding, a difference represented by this frame needs to be superposed on a previously buffered picture to generate a complete image.

A B frame is a bidirectionally predicted frame, and is also referred to as a bidirectional interpolation frame or bidirectional reference frame. The B frame uses a previous I frame or P frame and a subsequent P frame as reference frames. The B frame transmits a prediction error and a motion vector between the B frame and two adjacent reference frames. During decoding, based on the motion vector and the prediction error, two adjacent reference frames are combined to obtain a complete image.

The I frame uses intra prediction coding, and the P frame and B frame use inter prediction coding. Compared with the I frame, the P frame and the B frame have a higher compression ratio. Inter prediction coding mainly includes two parts. One part is an inter prediction part, and the other part is a residual compression part. The inter prediction part includes a prediction and compression module of inter side information and a transformation module. In a related technology, the inter side information is reflected as an optical flow. In an encoding process, images of a reference frame and a current frame are input into an optical flow estimation network, to obtain a predicted optical flow and compress the optical flow. In another related technology, the inter side information is reflected as a motion feature. In an encoding process, image features of a current frame and a reference frame are extracted, and the image features of the current frame and the reference frame are input into a CNN, to obtain a predicted motion feature and compress the motion feature. The transformation module usually performs a wrap operation, and in an encoding process, transforms a reference frame into a prediction result of a current frame by using inter side information.

However, in a related technology, prediction and compression of an optical flow are completely decoupled, and there is a problem that an optical flow obtained through prediction can better represent an inter change between a current frame and a reference frame, but the optical flow may not be easy to be compressed. This affects coding performance. In addition, a requirement on computing power of the optical flow estimation network is high, that is, a calculation amount for predicting the optical flow is large. In another related technology, the image features of the current frame and the reference frame are input into the CNN, so that motion between the current frame and the reference frame is fitted completely based on a convolution operation. Accuracy of the obtained motion feature is low, and it is difficult to predict a more accurate motion feature. This affects coding performance.

Correlation matrix: In this embodiment of this disclosure, a correlation matrix of a reference feature relative to a current feature is determined, so that a more accurate inter motion feature is predicted by using the correlation matrix. The correlation matrix is also referred to as a cross-correlation matrix, a neighboring cross-correlation matrix, a neighboring correlation matrix, or the like.

A calculation manner for determining a correlation matrix of one feature relative to another feature includes: giving two features F1 and F2 and a neighboring size, and calculating a neighboring correlation matrix of the feature F2 relative to the feature F1. The neighboring size is k*k, and dimensions of the feature F1 and the feature F2 both are c*h*w, where c, h, and w are respectively a quantity of channels, a height, and a width of the feature space, and h*w represents a size of the feature space. An operation of calculating the neighboring correlation matrix includes: donating a feature vector of a point (i, j) of the feature F1 as $$f_{i,j}^1,$$

where $i \in [1, h]$, and $j \in [1, w]$. A correlation value $$\text{corr}(f_{x,y}^2, f_{i,j}^1)$$

between a feature vector $$f_{x,y}^2$$

of all points in a neighboring range, in the feature F2, that uses a point (i, j) as a center and that has a size of k*k and $$f_{i,j}^1$$

is calculated. Finally, for each point in the feature F1, a set of correlation values of a size of k*k is obtained, to form a matrix whose dimension is k*k*h*w, that is, the correlation matrix of the feature F2 relative to the feature F1. A corr( ) function may be a distance function in any form, for example, a function such as an inner product function, a cosine (cos) function, an L1 distance function, or an L2 distance function, or a distance function obtained through convolutional learning.

The following describes implementation environments in embodiments of this disclosure.

FIG. 1 is a diagram of an implementation environment according to an embodiment of this disclosure. The implementation environment includes a source apparatus 10, a destination apparatus 20, a link 30, and a storage apparatus 40. The source apparatus 10 may generate an encoded video, that is, a bitstream. Therefore, the source apparatus 10 may also be referred to as an encoding apparatus. The destination apparatus 20 may decode the bitstream generated by the source apparatus 10. Therefore, the destination apparatus 20 may also be referred to as a decoding apparatus. The link 30 may receive the encoded video generated by the source apparatus 10, and may transmit the encoded video to the destination apparatus 20. The storage apparatus 40 may receive the encoded video generated by the source apparatus 10, and may store the encoded video. In this case, the destination apparatus 20 may directly obtain the encoded video from the storage apparatus 40. Alternatively, the storage apparatus 40 may correspond to a file server or another intermediate storage apparatus that may store the encoded video generated by the source apparatus 10. In this case, the destination apparatus 20 may transmit, in a streaming manner, or download the encoded video stored in the storage apparatus 40.

The source apparatus 10 and the destination apparatus 20 each may include one or more processors and a memory coupled to the one or more processors. The memory may include a random-access memory (RAM), a read-only memory (ROM), an electrically erasable programmable read-only memory (EEPROM), a flash memory, any other medium that can be configured to store required program encode in a form of instructions or data structures accessible to a computer, or the like. For example, the source apparatus 10 and the destination apparatus 20 may both include a mobile phone, a smartphone, a personal digital assistant (PDA), a wearable device, a pocket personal computer (PC) (PPC), a tablet computer, a smart in-vehicle infotainment, a smart television, a smart sound box, a desktop computer, a mobile computing apparatus, a notebook (for example, a laptop) computer, a tablet computer, a set-top box, a telephone handheld such as a so-called "smart" phone, a television, a camera, a display apparatus, a digital media player, a video game console, a vehicle-mounted computer, or the like.

The link 30 may include one or more media or apparatuses that can transmit the encoded video from the source apparatus 10 to the destination apparatus 20. In a possible implementation, the link 30 may include one or more communication media that can enable the source apparatus 10 to directly send the encoded video to the destination apparatus 20 in real time. In this embodiment of this disclosure, the source apparatus 10 may modulate the encoded video according to a communication standard, where the communication standard may be a wireless communication protocol or the like; and may send a modulated video to the destination apparatus 20. The one or more communication media may include a wireless communication medium and/or a wired communication medium. For example, the one or more communication media may include a radio frequency (RF) spectrum or one or more physical transmission lines. The one or more communication media may form a part of a packet-based network. The packet-based network may be a local area network, a wide area network, a global network (for example, the Internet), or the like. The one or more communication media may include a router, a switch, a base station, another device that facilitates communication from the source apparatus 10 to the destination apparatus 20, or the like. This is not limited in this embodiment of this disclosure.

In a possible implementation, the storage apparatus 40 may store a received encoded video sent by the source apparatus 10, and the destination apparatus 20 may directly obtain the encoded video from the storage apparatus 40. In this case, the storage apparatus 40 may include any one of a plurality of distributed or locally accessed data storage media. For example, the any one of a plurality of distributed or locally accessed data storage media may be a hard disk drive, a BLU-RAY disc, a digital versatile disc (DVD), a compact disc read-only memory (CD-ROM), a flash memory, a volatile or non-volatile memory, or any other appropriate digital storage medium configured to store a bitstream.

In a possible implementation, the storage apparatus 40 may correspond to a file server or another intermediate storage apparatus that may store a bitstream generated by the source apparatus 10, and the destination apparatus 20 may transmit, in a streaming manner, or download the bitstream stored in the storage apparatus 40. The file server may be any type of server that can store an encoded video and send the encoded video to the destination apparatus 20. In a possible implementation, the file server may include a network server, a File Transfer Protocol (FTP) server, a network attached storage (NAS) apparatus, a local disk drive, or the like. The destination apparatus 20 may obtain the encoded image through any standard data connection (including an Internet connection). The any standard data connection may include a wireless channel (for example, a WI-FI connection), a wired connection (for example, a digital subscriber line (DSL) or a cable modem), or a combination of a wireless channel and a wired connection that are suitable for obtaining the encoded video stored on the file server. Transmission of the encoded video from the storage apparatus 40 may be streaming transmission, transmission in a download manner, or a combination thereof.

The implementation environment shown in FIG. 1 is merely a possible implementation. In addition, technologies in embodiments of this disclosure are not only applicable to the source apparatus 10 that may encode an image and the destination apparatus 20 that may decode an encoded video in FIG. 1, but also applicable to another apparatus that may encode a video and decode a bitstream. This is not limited in embodiments of this disclosure.

In the implementation environment shown in FIG. 1, the source apparatus 10 includes a data source 120, an encoder 100, and an output interface 140. In some embodiments, the output interface 140 may include a modulator/demodulator (modem) and/or a sender. The sender may also be referred to as a transmitter. The data source 120 may include a video capture apparatus (for example, a camera), an archive containing a previously captured video, a feed interface for receiving a video from a video content provider, and/or a computer graphics system for generating a video, or a combination of these sources of video.

The data source 120 may send a video to the encoder 100. The encoder 100 may encode the received video sent by the data source 120, to obtain an encoded video. The encoder may send the encoded video to the output interface. In some embodiments, the source apparatus 10 directly sends the encoded video to the destination apparatus 20 through the output interface 140. In another embodiment, the encoded video may alternatively be stored in the storage apparatus 40 for the destination apparatus 20 to obtain subsequently for decoding and/or display.

In the implementation environment shown in FIG. 1, the destination apparatus 20 includes an input interface 240, a decoder 200, and a display apparatus 220. In some embodiments, the input interface 240 includes a receiver and/or a modem. The input interface 240 may receive an encoded video via the link 30 and/or from the storage apparatus 40, and then send the encoded video to the decoder 200. The decoder 200 may decode the received encoded video to obtain a decoded video. The decoder may send the decoded video to the display apparatus 220. The display apparatus 220 may be integrated with the destination apparatus 20 or disposed outside the destination apparatus 20. Generally, the display apparatus 220 displays the decoded video. The display apparatus 220 may be a display apparatus of any one of a plurality of types. For example, the display apparatus 220 may be a liquid crystal display (LCD), a plasma display, an organic light-emitting diode (OLED) display, or another type of display apparatus.

Although not shown in FIG. 1, in some aspects, the encoder 100 and the decoder 200 may be respectively integrated with an encoder and a decoder, and may include an appropriate multiplexer-demultiplexer (MUX-DEMUX) unit or other hardware and software for encoding both audio and a video in a shared data stream or a separate data stream. In some embodiments, if applicable, the MUX-DEMUX unit may comply with the International Telecommunication Unit (ITU) H.223 multiplexer protocol or another protocol such as a User Datagram Protocol (UDP).

The encoder 100 and the decoder 200 each may be any one of the following circuits: one or more microprocessors, a digital signal processor (DSP), an application-specific integrated circuit (ASIC), a field-programmable gate array (FPGA), discrete logic, hardware, or any combination thereof. If technologies in embodiments of this disclosure are partially implemented in software, an apparatus may store, in an appropriate non-volatile computer-readable storage medium, instructions for the software, and may use one or more processors to execute instructions in hardware, to implement the technologies in embodiments of this disclosure. Any one of the foregoing content (including hardware, software, a combination of hardware and software, and the like) may be considered as one or more processors. The encoder 100 and the decoder 200 each may be included in one or more encoders or decoders. Any one of the encoders or decoders may be integrated as a part of a combined encoder/decoder (codec) in a corresponding apparatus.

In this embodiment of this disclosure, the encoder 100 may be generally referred to as "signaling" or "sending" some information to another apparatus, for example, the decoder 200. The term "signaling" or "sending" may generally indicate transmission of a syntax element and/or other data used to decode a compressed video. Such transmission may occur in real time or almost in real time. Alternatively, such communication may occur after a period of time, for example, may occur when a syntax element in an encoded bitstream is stored in a computer-readable storage medium during encoding, and then a decoding apparatus may retrieve the syntax element at any time after the syntax element is stored in the medium.

Figure 2:
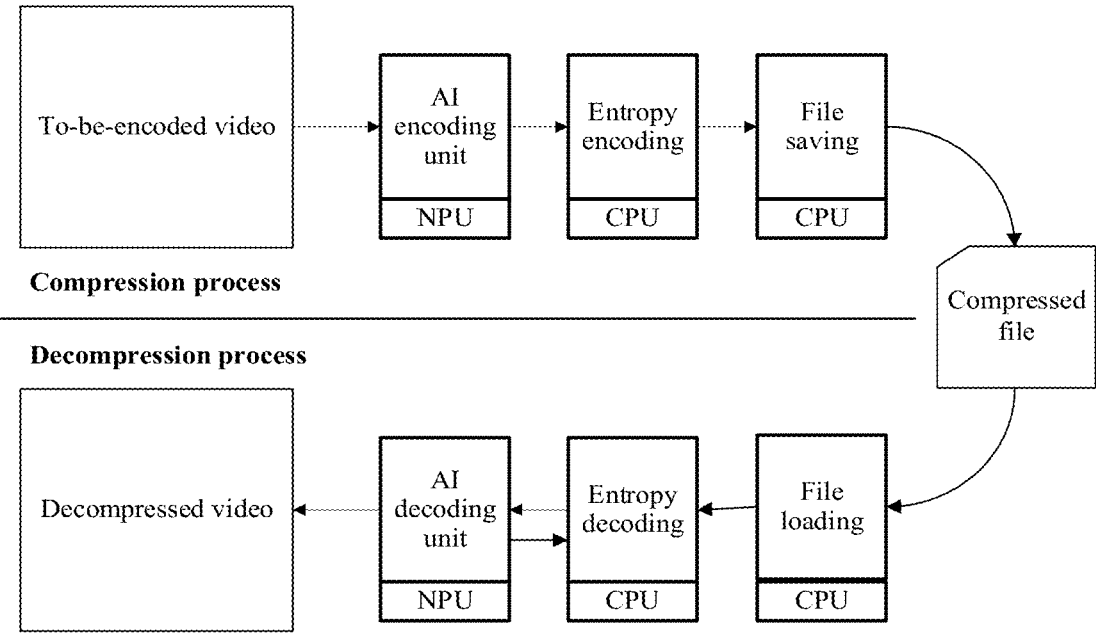
FIG. 2 is a diagram of another implementation environment according to an embodiment of this disclosure.

FIG. 2 is a diagram of another implementation environment according to an embodiment of this disclosure. The implementation environment includes an encoder side and a decoder side. The encoder side includes an AI encoding module, an entropy encoding module, and a file sending module. The decoder side includes a file loading module, an entropy decoding module, and an AI decoding module.

In a compression process, after obtaining a to-be-compressed video, the encoder side obtains, by using the AI encoding unit, an inter motion feature and a residual feature that are to be encoded, and performs entropy encoding on the inter motion feature and the residual feature, to obtain a bitstream, that is, a compressed file of the video. The encoder side saves the compressed file. In addition, the compressed file is transmitted to the decoder side, and the decoder side loads the compressed file, and obtains a decompressed video by using the entropy decoding unit and the AI decoding unit.

Optionally, the AI encoding unit includes one or more of an image feature extraction network, a motion encoding network, a residual encoding network, an entropy estimation network, a motion decoding network, a residual decoding network, or the like in the following. The AI decoding unit includes one or more of the motion decoding network, the residual decoding network, the entropy estimation network, or the like in the following.

Optionally, processes of processing data by the AI encoding unit and the AI decoding unit are implemented on an embedded neural network processing unit (NPU), to improve data processing efficiency. Processes such as entropy encoding, file saving, and loading are implemented on a central processing unit (CPU).

Optionally, the encoder side and the decoder side are one device, or the encoder side and the decoder side are two independent devices. That is, for one device, the device has both a video compression function and a video decompression function, or the device has a video compression function or a video decompression function.

It should be noted that an encoding/decoding method provided in embodiments of this disclosure may be applied to a plurality of scenarios, for example, service scenarios such as cloud storage, video surveillance, live broadcast, and transmission, and may be applied to terminal video recording, a video album, cloud storage, and the like. With reference to the implementation environments shown in FIG. 1 and FIG. 2, any encoding method in the following may be performed by an encoder side. Any decoding method in the following may be performed by a decoder side.

Figure 3:
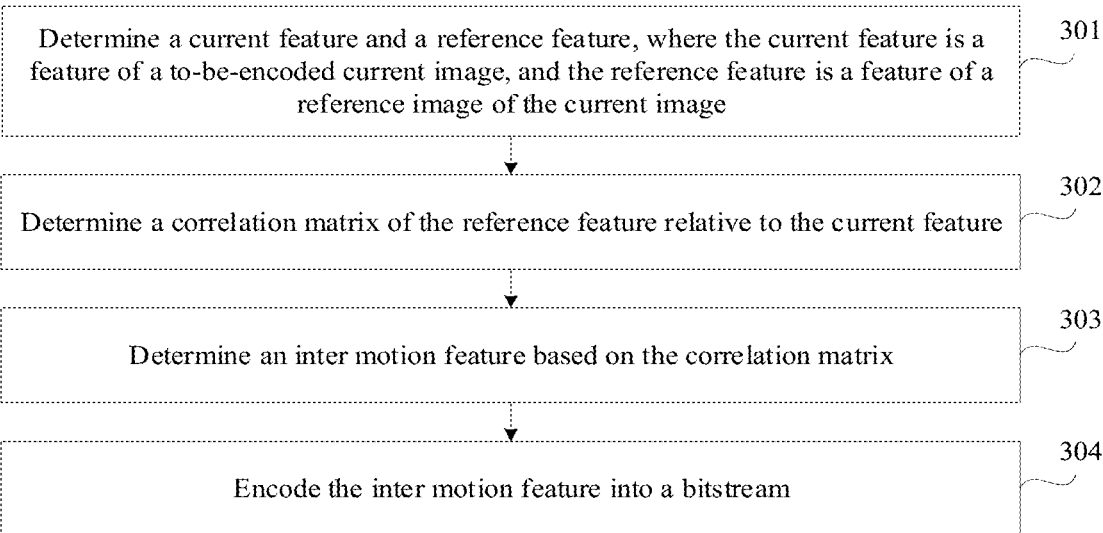
FIG. 3 is a flowchart of an encoding method according to an embodiment of this disclosure.

FIG. 3 is a flowchart of an encoding method according to an embodiment of this disclosure. The method is applied to an encoder side. Refer to FIG. 3. The method includes the following steps.

Step 301: Determine a current feature and a reference feature, where the current feature is a feature of a to-be-encoded current image, and the reference feature is a feature of a reference image of the current image.

In this embodiment of this disclosure, for inter prediction coding, the to-be-encoded current image corresponds to the reference image. For example, an image of a P frame corresponds to a reference image, and the reference image is an image of an I frame or a P frame before the P frame. For another example, an image of a B frame corresponds to two reference images, that is, an image of an I frame or a P frame before the B frame and an image of a P frame after the B frame. The following uses the P frame as an example for description.

In a process of performing inter prediction coding, an implementation in which the encoder side determines the current feature and the reference feature is: inputting the current image into an image feature extraction network to obtain the current feature, and inputting the reference image into the image feature extraction network to obtain the reference feature. The current feature is the feature of the to-be-encoded current image, and the reference feature is the feature of the reference image of the current image. In addition to extracting the feature of the image by using the image feature extraction network, the encoder side may alternatively extract the feature of the image in another implementation, for example, principal component analysis and a statistics-based method.

It should be noted that the image feature extraction network in this embodiment of this disclosure is obtained through pre-training. A network structure, a training manner, and the like of the image feature extraction network are not limited in this embodiment of this disclosure. For example, the image feature extraction network may be a network constructed based on a fully-connected network or a CNN, and convolution in the CNN may be two-dimensional (2D) convolution or three-dimensional (3D) convolution. In addition, a quantity of network layers and a quantity of nodes at each layer that are included in the image feature extraction network are not limited in this embodiment of this disclosure. In a specific implementation, the image feature extraction network is a network constructed based on Resblock.

Optionally, the reference image is a reconstructed image of a reference frame. The reference frame is a reference frame of a to-be-encoded current frame, and an original image of the to-be-encoded current frame is the current image. The reconstructed image of the reference frame is an image obtained by performing decompression after an original image of the reference frame is compressed according to the encoding method provided in this embodiment of this disclosure. In some other embodiments, the reference image is the original image of the reference frame.

Step 302: Determine a correlation matrix of the reference feature relative to the current feature.

To improve prediction accuracy of an inter motion feature, the correlation matrix is introduced in the scheme. In this embodiment of this disclosure, the encoder side determines the correlation matrix of the reference feature relative to the current feature. For a manner of calculating the correlation matrix, refer to the foregoing description.

Step 303: Determine the inter motion feature based on the correlation matrix.

It should be noted that there are a plurality of implementations in which the encoder side determines the inter motion feature based on the correlation matrix of the reference feature relative to the current feature. The following describes several implementations in detail.

In a first implementation, the encoder side inputs the correlation matrix, the current feature, and the reference feature into a motion encoding network to obtain the inter motion feature. In a second implementation, the encoder side inputs the correlation matrix, the current image, and the reference image into a motion encoding network to obtain the inter motion feature. In a third implementation, the encoder side inputs the correlation matrix into a motion encoding network to obtain the inter motion feature.

In a fourth implementation, the encoder side uses the reference feature as a predicted feature, and inputs the correlation matrix, the predicted feature, and the current feature into a motion encoding network to obtain a motion feature. The encoder side determines a quantity of iterations. If the quantity of iterations is less than an iteration quantity threshold, the encoder side inputs the motion feature into a motion decoding network to obtain a reconstructed motion feature, transforms the reference feature based on the reconstructed motion feature to re-determine the predicted feature, re-determines a correlation matrix of the predicted feature relative to the current feature, and returns to perform the step of inputting the correlation matrix, the predicted feature, and the current feature into a motion encoding network to obtain a motion feature. If the quantity of iterations is equal to the iteration quantity threshold, the encoder side determines the motion feature as the inter motion feature.

In a process of first iterative processing, the quantity of iterations is equal to an initial value, and in a process of last iterative processing, the quantity of iterations is equal to the iteration quantity threshold. Optionally, the initial value is 0, and the iteration quantity threshold is K−1; or the initial value is 1, and the iteration quantity threshold is K. K is a positive integer greater than or equal to 1, and K represents a total quantity of times of iterative processing.

For example, it is assumed that the total quantity of times of iterative processing is K, the initial value is 1, and the iteration quantity threshold is K, the to-be-encoded current image $x_t$, is a $t^{th}$ frame in a video, t>0, the reference image of the current image $x_t$ is the reconstructed image $\hat{x}_{t-1}$ of the reference frame, the current feature is $F_t$, the reference feature is $\hat{F}_{t-1}$, and the correlation matrix of the reference feature $\hat{F}_{t-1}$, relative to the current feature $F_t$ is $C_t$. A process of iterative processing in an encoding process is as follows: in a process of $i^{th}$ iterative processing, input the correlation matrix $$C_t^i,$$

the predicted feature $$\tilde{F}_t^i,$$

and the current feature $F_t$ into the motion encoding network to obtain the motion feature $$\hat{m}_t^i,$$

where when i=1, a predicted feature $$\tilde{F}_t^1$$

is equal to the reference feature $\hat{F}_{t-1}$, and a correlation matrix $$C_t^1$$

is equal to the correlation matrix $C_t$; determine whether i is less than K; if i is less than K, input the motion feature $$\hat{m}_t^i$$

into the motion decoding network to obtain the reconstructed motion feature $$M_t^i;$$

transform the reference feature $\hat{F}_{t-1}$ based on the reconstructed motion feature $$M_t^i$$

to obtain a predicted feature $$\tilde{F}_t^{i+1};$$

determine a correlation matrix $$C_t^{i+1}$$

of the predicted feature $$\tilde{F}_t^{i+1}$$

relative to the current feature $F_t$; then, execute $(i+1)^{th}$ iterative processing; if i=K, use the motion feature $$\hat{m}_t^i$$

as the inter motion feature; and end the process of iterative processing.

In a fifth implementation, the encoder side uses the reference image as a predicted image, and inputs the correlation matrix, the predicted image, and the current image into a motion encoding network to obtain a motion feature. The encoder side determines a quantity of iterations. If the quantity of iterations is less than an iteration quantity threshold, the encoder side inputs the motion feature into a motion decoding network to obtain a reconstructed motion feature, transforms the reference image based on the reconstructed motion feature to re-determine a predicted image, determines a predicted feature, that is, a feature of the predicted image, re-determines a correlation matrix of the predicted feature relative to the current feature, and returns to perform the step of inputting the correlation matrix, the predicted image, and the current image into a motion encoding network to obtain a motion feature. If the quantity of iterations is equal to the iteration quantity threshold, the encoder side determines the motion feature as the inter motion feature.

It can be learned from the foregoing description that, in the fourth and fifth implementations, the encoder side improves the prediction accuracy of the inter motion feature through a plurality of iterations. In other words, motion details are further enriched by iteratively updating the motion feature. However, in the first to the third implementations, the encoder side determines the inter motion feature through one iteration, so that coding time can be reduced.

Figure 4:
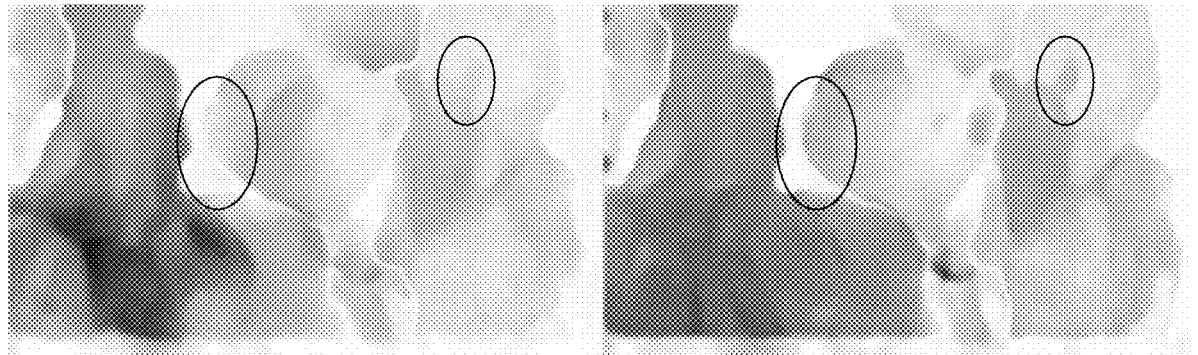
FIG. 4 is a comparison diagram of reconstructed motion features according to an embodiment of this disclosure.

It should be noted that higher prediction accuracy of the inter motion feature indicates richer motion details represented by the reconstructed motion feature. In this embodiment of this disclosure, the reconstructed motion feature is also referred to as reconstructed motion information. FIG. 4 is a comparison diagram of reconstructed motion features according to an embodiment of this disclosure. FIG. 4 shows reconstructed motion features of a same image in a video. A first column is a reconstructed motion feature obtained after first iterative processing, and a second column is a reconstructed motion feature obtained after second iterative processing. In FIG. 4, some regions with obvious contrast are circled by using ellipses. It can be learned that an edge structure of the second column is clearer, more explicit, and more accurate. In other words, compared with the reconstructed motion feature of the first column, the reconstructed motion feature of the second column has more obvious detail information.

In addition, the motion encoding network and the motion decoding network in this embodiment of this disclosure are obtained through pre-training. Network structures, training manners, and the like of the motion encoding network and the motion decoding network are not limited in this embodiment of this disclosure. For example, the motion encoding network and the motion decoding network both may be fully-connected networks or CNNs, and convolution in the CNN may be 2D convolution or 3D convolution. In addition, a quantity of network layers and a quantity of nodes at each layer that are included in each of the motion encoding network and the motion decoding network are not limited in this embodiment of this disclosure.

Figure 5:
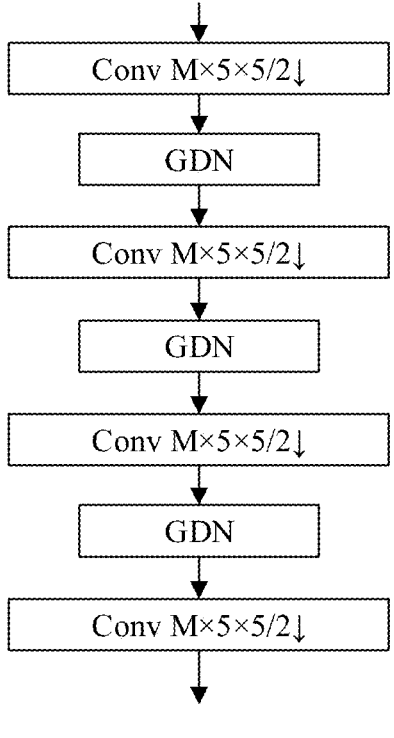
FIG. 5 is a diagram of a structure of an encoding network according to an embodiment of this disclosure.

FIG. 5 is a diagram of a structure of an encoding network according to an embodiment of this disclosure. The encoding network may be the motion encoding network. Refer to FIG. 5. The encoding network is a CNN, and the CNN includes four convolution layers (Conv) and three grasp detection network (GDN) layers that are interleaved and concatenated. A size of a convolution kernel of each convolution layer is 5×5, a quantity of channels of an output feature map is M, and downsampling by a factor of 2 is performed on a width and a height at each convolution layer. It should be noted that the structure of the encoding network shown in FIG. 5 is not intended to limit this embodiment of this disclosure. For example, a size of a convolution kernel, a quantity of channels of a feature map, a downsampling multiple, a quantity of times of downsampling, a quantity of convolution layers, and the like may all be adjusted.

Figure 6:
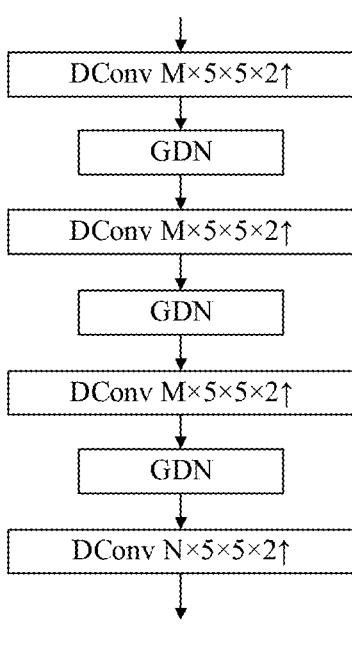
FIG. 6 is a diagram of a structure of a decoding network according to an embodiment of this disclosure.

FIG. 6 is a diagram of a structure of a decoding network according to an embodiment of this disclosure. The decoding network may be the motion decoding network. Refer to FIG. 6. The decoding network is a CNN, and the CNN includes four Conv and three GDN layers that are interleaved and concatenated. A size of a convolution kernel of each convolution layer is 5×5, a quantity of channels of an output feature map is M or N, and upsampling by a factor of 2 is performed on a width and a height at each convolution layer. It should be noted that the structure of the decoding network shown in FIG. 6 is not intended to limit this embodiment of this disclosure. For example, a size of a convolution kernel, a quantity of channels of a feature map, a upsampling multiple, a quantity of times of upsampling, a quantity of convolution layers, and the like may all be adjusted.

Step 304: Encode the inter motion feature into a bitstream.

In this embodiment of this disclosure, the encoder side encodes the inter motion feature into the bitstream, so that the decoder side subsequently decompresses the video based on the inter motion feature in the bitstream.

Optionally, the encoder side encodes the inter motion feature into the bitstream through entropy encoding. In an implementation, the encoder side encodes the inter motion feature into the bitstream through entropy encoding based on a specified first probability distribution parameter. In another implementation, the encoder side inputs the inter motion feature into a hyper encoder network (which may also be referred to as a hyper-prior network) to obtain a first hyper-prior feature. The encoder side encodes the first hyper-prior feature into the bitstream through entropy encoding based on a specified second probability distribution parameter. In addition, the encoder side inputs the first hyper-prior feature (the first hyper-prior feature obtained by the bitstream or the first hyper-prior feature obtained by using the hyper encoder network) into a hyper decoder network to obtain a first prior feature. The encoder side determines probability distribution parameters of the inter motion feature based on the first prior feature, and encodes the inter motion feature into the bitstream through entropy encoding based on the probability distribution parameters of the inter motion feature. It should be noted that the encoder side encodes the first hyper-prior feature into the bitstream, so that the decoder side parses out the inter motion feature from the bitstream based on the first hyper-prior feature.

Both the specified first probability distribution parameter and the specified second probability distribution parameter are probability distribution parameters that are pre-determined by using a corresponding probability distribution estimation network. A network structure and a training method used for the used probability distribution estimation network are not limited in this embodiment of this disclosure. For example, the network structure of the probability distribution estimation network may be a fully-connected network or a CNN. In addition, a quantity of layers and a quantity of nodes at each layer that are included in the network structure of the probability distribution estimation network are not limited in this embodiment of this disclosure.

The foregoing describes an implementation process in which the encoder side determines the inter motion feature and encodes the inter motion feature. It should be noted that, for inter prediction coding, in addition to determining and encoding the inter motion feature, the encoder side further determines a residual feature and encodes the residual feature, so that the decoder side decompresses the video based on the inter motion feature and the residual feature.

Figure 7:
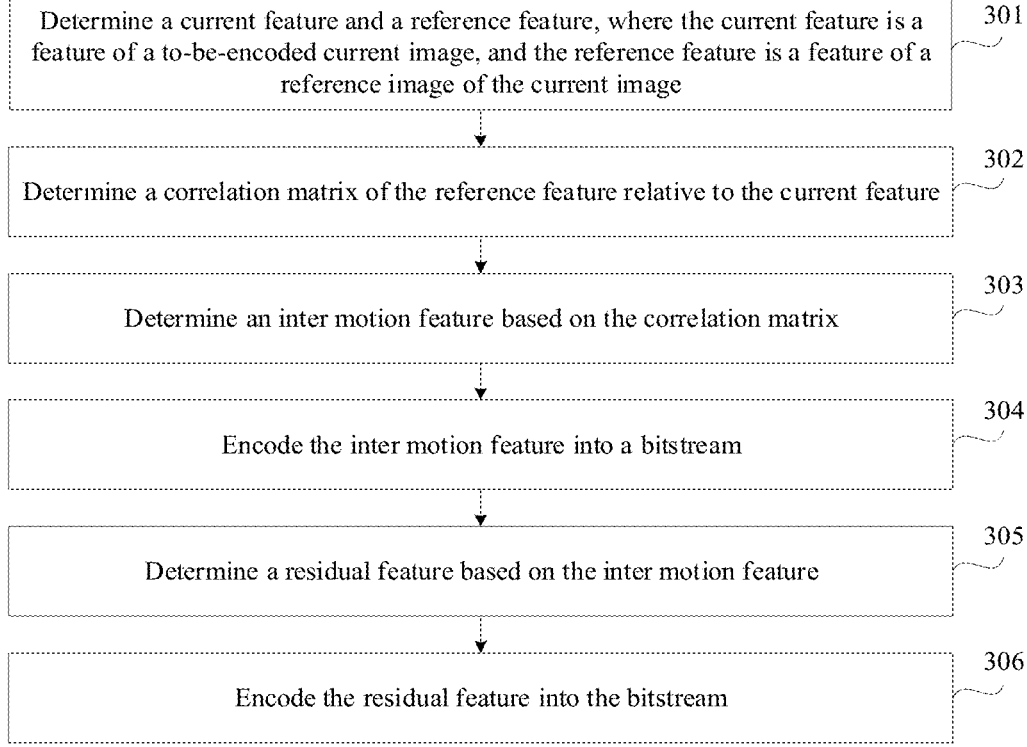
FIG. 7 is a flowchart of another encoding method according to an embodiment of this disclosure.

In other words, refer to FIG. 7. The encoding method provided in this embodiment of this disclosure further includes the following step 305 and step 306.

Step 305: Determine the residual feature based on the inter motion feature.

In this embodiment of this disclosure, the encoder side determines the residual feature based on the inter motion feature.

In an implementation, the encoder side inputs the inter motion feature into the motion decoding network to obtain the reconstructed motion feature between the current image and the reference image. The encoder side transforms the reference feature based on the reconstructed motion feature between the current image and the reference image to obtain the predicted feature of the current image. The encoder side determines a first residual, where the first residual is a residual between the predicted feature of the current image and the current feature; and inputs the first residual into a residual encoding network to obtain the residual feature. In other words, the encoder side performs transformation and prediction in feature space.

In another implementation, the encoder side inputs the inter motion feature into the motion decoding network to obtain the reconstructed motion feature between the current image and the reference image. The encoder side transforms the reference image based on the reconstructed motion feature between the current image and the reference image to obtain a predicted image. The encoder side determines a second residual, where the second residual is a residual between the predicted image and the current image; and inputs the second residual into the residual encoding network to obtain the residual feature. The predicted image is the predicted image of the current image. In other words, the encoder side performs transformation and prediction in image space.

It should be noted that the motion decoding network in step 305 and the motion decoding network in step 303 are the same motion decoding network. The residual encoding network in step 305 is obtained through pre-training. A network structure, a training manner, and the like of the residual encoding network are not limited in this embodiment of this disclosure. For example, the residual encoding network may be a fully-connected network or a CNN, and convolution in the CNN may be 2D convolution or 3D convolution. In addition, a quantity of network layers and a quantity of nodes at each layer that are included in the residual encoding network are not limited in this embodiment of this disclosure. Optionally, the network structure of the residual encoding network is also the network structure shown in FIG. 5.

Step 306: Encode the residual feature into the bitstream.

In this embodiment of this disclosure, the encoder side encodes the residual feature into the bitstream, so that the decoder side subsequently decompresses the video based on the inter motion feature and the residual feature in the bitstream.

Optionally, the encoder side encodes the residual feature into the bitstream through entropy encoding. In an implementation, the encoder side encodes the residual feature into the bitstream through entropy encoding based on a specified third probability distribution parameter. In another implementation, the encoder side inputs the residual feature into the hyper encoder network to obtain a second hyper-prior feature. The encoder side encodes the second hyper-prior feature into the bitstream through entropy encoding based on a specified fourth probability distribution parameter. In addition, the encoder side inputs the second hyper-prior feature (the second hyper-prior feature obtained by parsing the bitstream or the second hyper-prior feature obtained by using the hyper encoder network) into the hyper decoder network to obtain a second prior feature. The encoder side determines probability distribution parameters of the residual feature based on the second prior feature, and encodes the residual feature into the bitstream through entropy encoding based on the probability distribution parameters of the residual feature. It should be noted that the encoder side encodes the second hyper-prior feature into the bitstream, so that the decoder side parses out the residual feature from the bitstream based on the second hyper-prior feature.

Both the specified third probability distribution parameter and the specified fourth probability distribution parameter are probability distribution parameters that are pre-determined by using a corresponding probability distribution estimation network. A network structure and a training method used for the used probability distribution estimation network are not limited in this embodiment of this disclosure. For example, the network structure of the probability distribution estimation network may be a fully-connected network or a CNN. A quantity of layers and a quantity of nodes at each layer that are included in the network structure of the probability distribution estimation network are not limited in this embodiment of this disclosure. In addition, the hyper encoder network used for encoding the residual feature is the same as or different from the hyper encoder network used for encoding the inter motion feature, and the hyper decoder network used for decoding the residual feature is the same as or different from the hyper decoder network used for decoding the inter motion feature.

It should be noted that, if any one of the foregoing probability distribution estimation networks is modeled by using a Gaussian model (for example, a single Gaussian model or a hybrid Gaussian model), estimated probability distribution parameters include a mean value and a variance. For example, assuming that a residual feature whose probability distribution parameters are to be estimated meets a single Gaussian model or a hybrid Gaussian model, the probability distribution parameters that are of the residual feature and that are obtained by using the probability distribution estimation network include a mean value and a variance. If any one of the foregoing probability distribution estimation networks is modeled by using a Laplacian distribution model, the estimated probability distribution parameters include a position parameter and a scale parameter. If any one of the foregoing probability distribution estimation networks is modeled by using a logistic distribution model, the estimated probability distribution parameters include a mean value and a scale parameter. In addition, the probability distribution estimation network in this embodiment of this disclosure may also be referred to as a factor entropy model, the probability distribution estimation network is a part of the entropy estimation network, and the entropy estimation network further includes the foregoing hyper encoder network and hyper decoder network. For example, the hyper encoder network used for encoding the inter motion feature, the probability distribution estimation network, and the hyper decoder network form a part or all of one entropy estimation network, and the hyper encoder network used for encoding the residual feature, the probability distribution estimation network, and the hyper decoder network form a part or all of another entropy estimation network.

Figure 8:
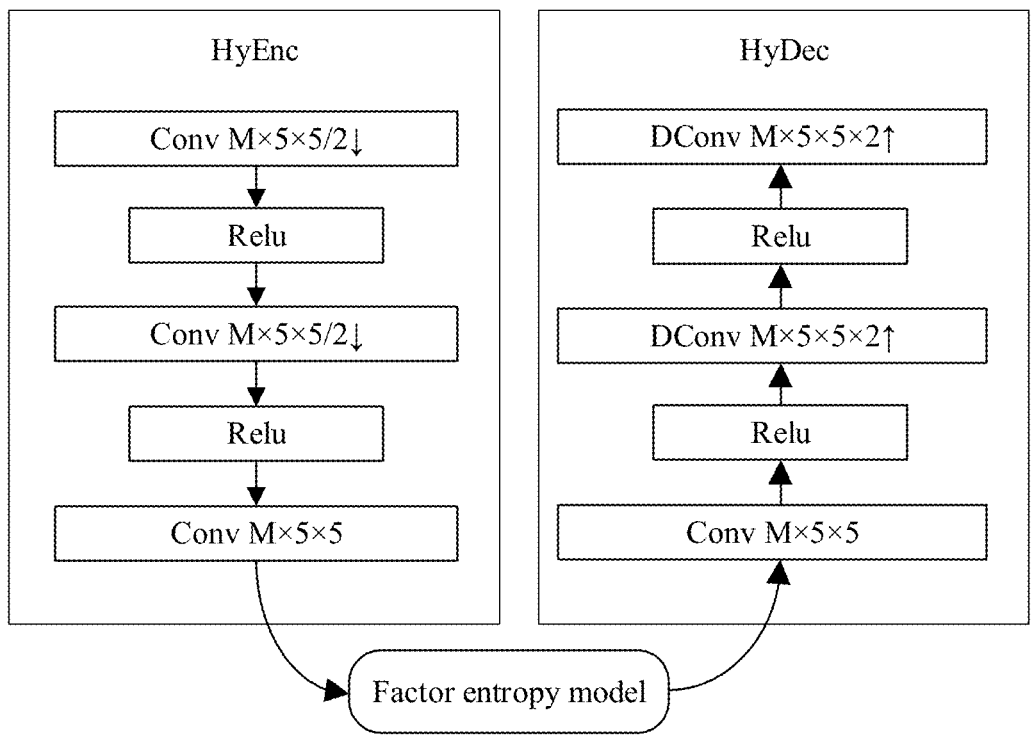
FIG. 8 is a diagram of a structure of an entropy estimation network according to an embodiment of this disclosure.

FIG. 8 is a diagram of a structure of an entropy estimation network according to an embodiment of this disclosure. The entropy estimation network may be any one of the foregoing entropy estimation networks. Refer to FIG. 8. The entropy estimation network includes a hyper encoder (HyEnc) network, a factor entropy model, and a hyper decoder (HyDec) network. The hyper encoder network includes three Conv and two activation layers (such as activation layers constructed based on Relu or another activation function) that are interleaved and concatenated. A size of a convolution kernel of each convolution layer is 5×5, a quantity of channels of an output feature map is M, downsampling by a factor of 2 is performed on a width and a height at the first two convolution layers, and downsampling is not performed at a last convolution layer. A network structure of the factor entropy model is the network structure of the probability distribution estimation network described above. The hyper encoder network includes three Conv and two activation layers (such as activation layers constructed based on Relu or another activation function) that are interleaved and concatenated. A size of a convolution kernel of each convolution layer is 5×5, a quantity of channels of an output feature map is M, upsampling is not performed on a first convolution layer, and upsampling by a factor of 2 is performed on a width and a height at the last two convolution layers. It should be noted that the structure of the entropy estimation network shown in FIG. 8 is not intended to limit this embodiment of this disclosure. For example, a size of a convolution kernel, a quantity of channels of a feature map, a downsampling multiple, a quantity of downsampling times, an upsampling multiple, a quantity of upsampling times, a quantity of convolution layers, and the like may all be adjusted.

It can be learned from the foregoing step 305 and step 306 that, in this embodiment of this disclosure, the encoder side first obtains the residual (the first residual or the second residual), then obtains the residual feature, and further encodes the residual feature. This is equivalent to compressing the residual. In some other embodiments, the encoder side may directly encode the residual into the bitstream after obtaining the residual. In other words, the residual is not compressed.

Figure 9:
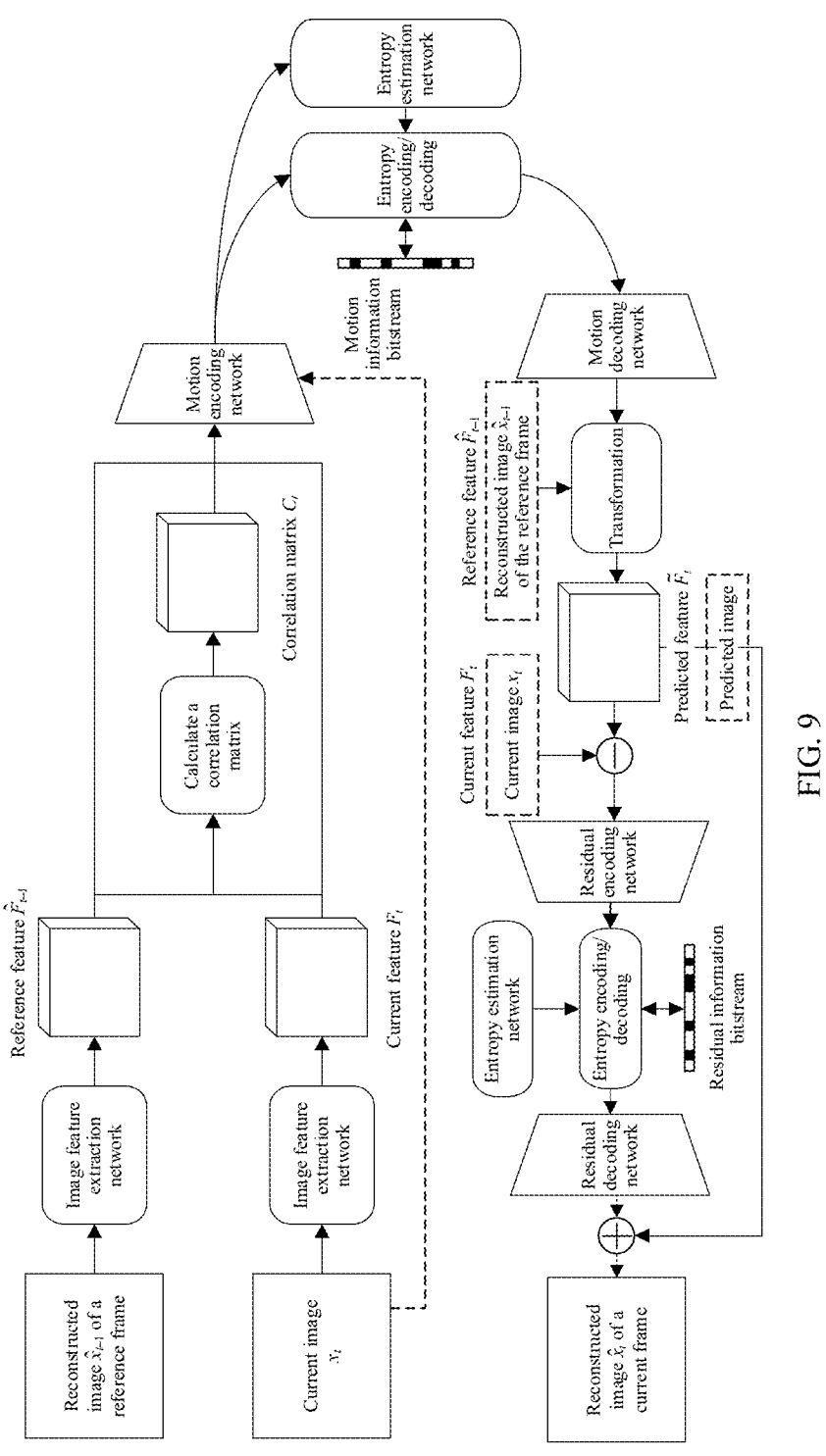
FIG. 9 is a flowchart of an encoding/decoding method according to an embodiment of this disclosure.

FIG. 9 is a flowchart of a video coding/decoding method according to an embodiment of this disclosure. In FIG. 9, it is assumed that a to-be-encoded current image $x_t$ is a $t^{th}$ frame in a video, $t>0$, and a reference image of the current image $x_t$ is a reconstructed image $\hat{x}_{t-1}$ of a reference frame. An encoding process of encoding the current image $x_t$ includes the following step 901 to step 910.

Step 901: Separately input the current image $x_t$ and the reference image $\hat{x}_{t-1}$ into an image feature extraction network to obtain a current feature $F_t$ and a reference feature $\hat{F}_{t-1}$. Dimensions of the current feature $F_t$ and reference feature $\hat{F}_{t-1}$ are both c1\*h1\*w1.

Step 902: Calculate a correlation matrix $C_t$ of the reference feature $F_t$ relative to the current feature $F_t$. A dimension of the correlation matrix $C_t$ is k\*k\*h1\*w1.

Step 903: Input the correlation matrix $C_t$, the current feature $F_t$, and the reference feature $\hat{F}_{t-1}$, into a motion encoding network to obtain an inter motion feature $\hat{m}_t$. The inter motion feature $\hat{m}_t$ is a to-be-encoded motion feature. Optionally, a dimension of the inter motion feature m, is c1\*h2\*w2, and generally, h2<h1, and w2<w1.

Step 904: Determine, by using an entropy estimation network, probability distribution parameters corresponding to each element in the inter motion feature $\hat{m}_t$, for example, a mean value $\mu_{m,t}$ and a variance $\sigma_{m,t}$.

Step 905: Encode the inter motion feature $\hat{m}_t$ into a bitstream through entropy encoding based on the probability distribution parameters corresponding to each element in the inter motion feature $\hat{m}_t$. Optionally, the bitstream is a bit stream, and a bit sequence obtained by performing entropy encoding on the inter motion feature $\hat{m}_t$ is a part of a bit sequence included in the bitstream, and this part of the bit sequence is referred to as a motion information bitstream or a motion information bit stream.

Step 906: Input the inter motion feature $\hat{m}_t$ into a motion decoding network to obtain a reconstructed motion feature $M_t$. Optionally, a dimension of the reconstructed motion feature $M_t$ is c2\*h1\*w1, and usually, c2<c1. In some embodiments, c2 may be greater than or equal to c1.

Step 907: Transform the reference feature $\hat{F}_{t-1}$, into a predicted feature $\tilde{F}_t$ by using the reconstructed motion feature $M_t$. A dimension of the predicted feature $\tilde{F}_t$ is c1\*h1\*w1.

Step 908: Calculate a residual between the current feature $F_t$ and the predicted feature $\tilde{F}_t$, and input the residual into a residual encoding network to obtain a residual feature $\hat{r}_t$. The residual feature $\hat{r}_t$ is a to-be-encoded residual feature.

Step 909: Determine, by using the entropy estimation network, probability distribution parameters corresponding to each element in the residual feature $\hat{r}_t$, for example, a mean value $\mu_{r,t}$ and a variance $\sigma_{m,t}$.

Step 910: Encode the residual feature $\hat{r}_t$ into the bitstream through entropy encoding based on the probability distribution parameters corresponding to each element in the residual feature $\hat{r}_t$. It is assumed that the bitstream is a bit stream, a bit sequence obtained by performing entropy encoding on the residual feature $\hat{r}_t$ is a part of a bit sequence included in the bitstream, and this part of the bit sequence is referred to as a residual information bitstream or a motion information bit stream.

Optionally, after the current image is encoded, if the current image $x_t$ further needs to be used as a reference image of a to-be-encoded image in a subsequent encoding process, the encoder side further inputs the residual feature $\hat{r}_t$ into the residual decoding network to obtain a reconstructed residual. The encoder side obtains a reconstructed feature of the current image $x_t$ based on the predicted feature $\tilde{F}_t$ and the reconstructed residual, and inputs the reconstructed feature of the current image $x_t$ into an image reconstruction network to obtain a reconstructed image $\hat{r}_t$ of a current frame.

It should be noted that the image reconstruction network is not shown in FIG. 9, the image reconstruction network may be a deconvolutional network, and the image reconstruction network may match the image feature extraction network. In addition, the residual decoding network is obtained through pre-training. A network structure, a training manner, and the like of the residual decoding network are not limited in this embodiment of this disclosure. For example, the residual decoding network may be a fully-connected network or a CNN. In addition, a quantity of network layers and a quantity of nodes at each layer that are included in the residual decoding network are not limited in this embodiment of this disclosure. The network structure of the residual decoding network may be the network structure shown in FIG. 6.

In addition, with reference to dashed line parts shown in FIG. 9, the foregoing step 903 may be replaced with: inputting the correlation matrix $C_t$, the current image $x_t$, and the reference image $\hat{x}_{t-1}$ into the motion encoding network to obtain the inter motion feature $\hat{m}_t$, to obtain another embodiment. The foregoing step 907 may also be replaced with: transforming the reference image $\hat{x}_{t-1}$ into a predicted image $\tilde{x}_t$ by using the reconstructed motion feature $M_t$, and step 908 is replaced with: calculating a residual between the current image $x_t$ and the predicted image. $\tilde{x}_t$, and inputting the residual into the residual encoding network to obtain the residual feature $\hat{r}_t$, to obtain still another embodiment. In addition, in this embodiment, a difference between a subsequent step of obtaining the reconstructed image $\hat{r}_t$ of the current frame and the step described in the previous paragraph lies in: obtaining the reconstructed image $\hat{r}_t$ of the current frame based on the predicted image $\tilde{x}_t$ and the reconstructed residual.

It should be noted that, in the flowchart of the video coding/decoding method shown in FIG. 9, the inter motion feature is not obtained through a plurality of iterations. If a reconstructed motion feature with richer details is needed, an iterative procedure (for example, an iterative procedure shown in FIG. 10 below) described in the foregoing step 303 may be applied to the video coding/decoding method shown in FIG. 9, to obtain an inter motion feature with higher accuracy through a plurality of iterations.

Figure 10:
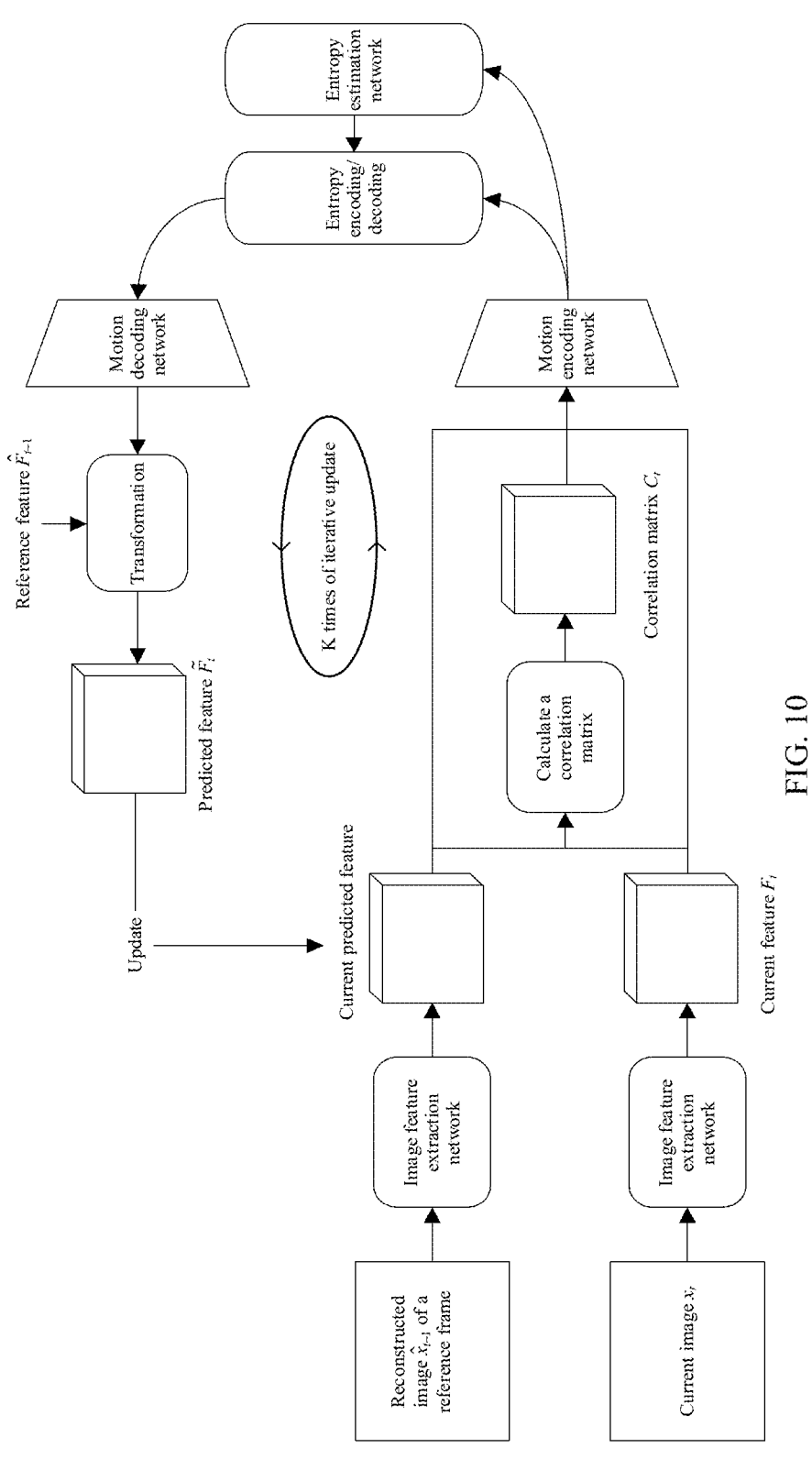
FIG. 10 is a partial flowchart of an encoding method according to an embodiment of this disclosure.

FIG. 10 is a partial flowchart of an encoding method according to an embodiment of this disclosure. In FIG. 10, it is assumed that a total quantity of times of iterative processing is K, an initial value is 0, a threshold of a quantity of iterations is K−1, a to-be-encoded current image $x_t$ is a $t^{th}$ frame in a video, t>0, and a reference image of the current image $x_t$ is a reconstructed image $\hat{r}_{t−1}$ of a reference frame. An encoding process of encoding the current image $x_t$ includes the following step 1001 to step 1010.

Step 1001: Separately input the current image $x_t$ and the reference image $\hat{x}_{t−1}$ into an image feature extraction network to obtain a current feature $F_t$ and a reference feature $\hat{F}_{t−1}$.

Step 1002: Calculate a correlation matrix $C_t$ of the reference feature $\hat{F}_{t−1}$, relative to the current feature $F_t$.

Step 1003: Use the reference feature $\hat{F}_{t−1}$ as a predicted feature $\tilde{F}_t$ of first iterative processing, and use the correlation matrix $C_t$ as a correlation matrix of the predicted feature $\tilde{F}_t$ relative to the current feature $F_t$.

Step 1004: Input the correlation matrix $C_t$, the predicted feature $\tilde{F}_t$, and the current feature $F_t$ into a motion encoding network to obtain a motion feature $\hat{m}_t$, and determine a quantity i of iterations. A quantity i of iterations determined for the first time is 0, and after the first time, a quantity of iterations determined each time is equal to a quantity of iterations determined last time plus 1.

Step 1005: Determine whether i is less than K−1; if i is less than K−1, perform step 1006; and if i=K−1, use the motion feature $\hat{m}_t$ as an inter motion feature, and perform step 1009.

Step 1006: Input the motion feature $\hat{m}_t$ into a motion decoding network to obtain a reconstructed motion feature $M_t$.

Step 1007: Transform the reference feature $\hat{F}_{t−1}$ based on the reconstructed motion feature $M_t$ to re-predict the feature $\tilde{F}_t$.

Step 1008: Re-determine the correlation matrix $C_t$ of the predicted feature $\tilde{F}_t$ relative to the current feature $F_t$, and return to step 1004.

Step 1009: Determine, by using an entropy estimation network, probability distribution parameters corresponding to each element in the inter motion feature $\hat{m}_t$.

Step 1010: Encode the inter motion feature $\hat{m}_t$ into a bitstream through entropy encoding based on the probability distribution parameters corresponding to each element in the inter motion feature $\hat{m}_t$.

Step 1011: Input the inter motion feature $\hat{m}_t$ into a motion decoding network to obtain the reconstructed motion feature $M_t$.

Step 1012: Transform the reference feature $\hat{F}_{t−1}$ into the predicted feature $\tilde{F}_t$ by using the reconstructed motion feature $M_t$.

Step 1013: Calculate a residual between the current feature $F_t$ and the predicted feature $\tilde{F}_t$, and input the residual into a residual encoding network to obtain a residual feature $\hat{r}_t$.

Step 1014: Determine, by using the entropy estimation network, probability distribution parameters corresponding to each element in the residual feature $\hat{r}_t$.

Step 1015: Encode the residual feature $\ddot{r}_t$ into the bitstream through entropy encoding based on the probability distribution parameters corresponding to each element in the residual feature $\hat{r}_t$.

Figure 11:
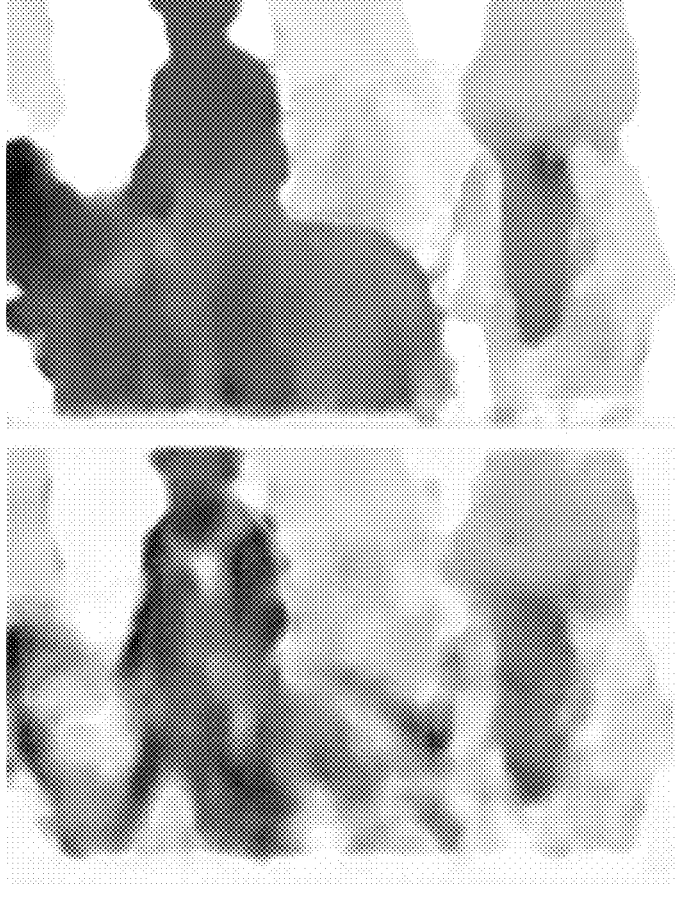
FIG. 11 is another comparison diagram of reconstructed motion features according to an embodiment of this disclosure.

FIG. 11 is another comparison diagram of reconstructed motion features according to an embodiment of this disclosure. FIG. 11 shows reconstructed motion features of a same image in a video. A first row is a reconstructed motion feature obtained in the video coding/decoding method shown in FIG. 9, and a second row is a reconstructed motion feature obtained in a related technology. In the related technology, image features of a current frame and a reference frame are input into a CNN, so that motion between the current frame and the reference frame is fitted completely based on a convolution operation. It can be learned that an edge structure of the first row is clearer, more explicit, and more accurate. In other words, compared with the reconstructed motion feature of the second row, the reconstructed motion feature of the first row has more obvious detail information.

It can be learned from the foregoing description that this scheme can be applied to both a P frame and a B frame, and the foregoing encoding process uses the P frame as an example. For the B frame, a current image corresponds to two reference images. In an implementation, the encoder side obtains two inter motion features and two residual features based on the two reference images according to the foregoing method, and encodes the two inter motion features and the two residual features into a bitstream. The two inter motion features respectively correspond to the two reference images, and the two residual features also respectively correspond to the two reference images. In another implementation, the encoder side obtains two inter motion features based on the two reference images according to the foregoing method, and encodes the two inter motion features into a bitstream. The encoder side transforms a reference feature based on the two inter motion features to separately obtain two predicted features, fuses the two predicted features to obtain a fused predicted feature, obtains a residual feature based on the fused predicted feature and a current feature, and encodes the residual feature into the bitstream.

Figure 12:
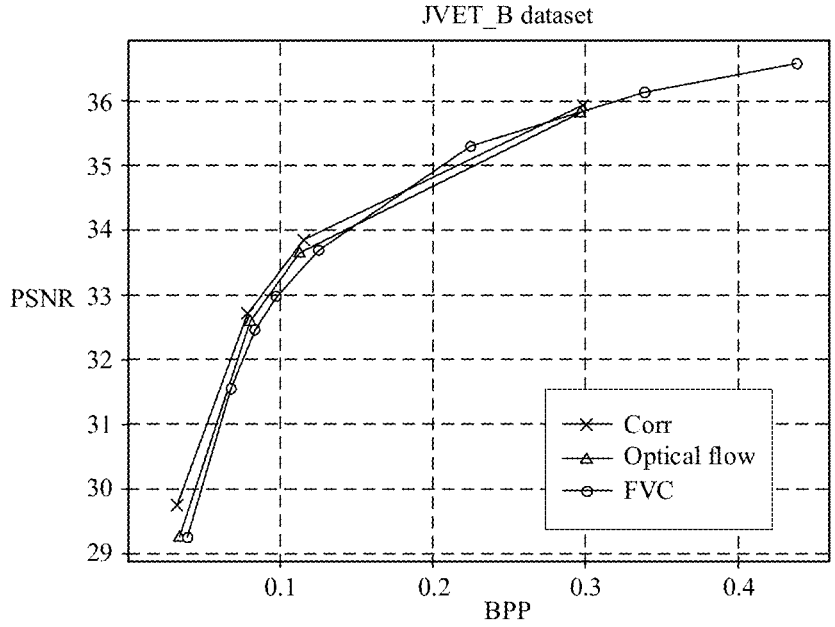
FIG. 12 is a comparison diagram of coding performance according to an embodiment of this disclosure.
Figure 13:
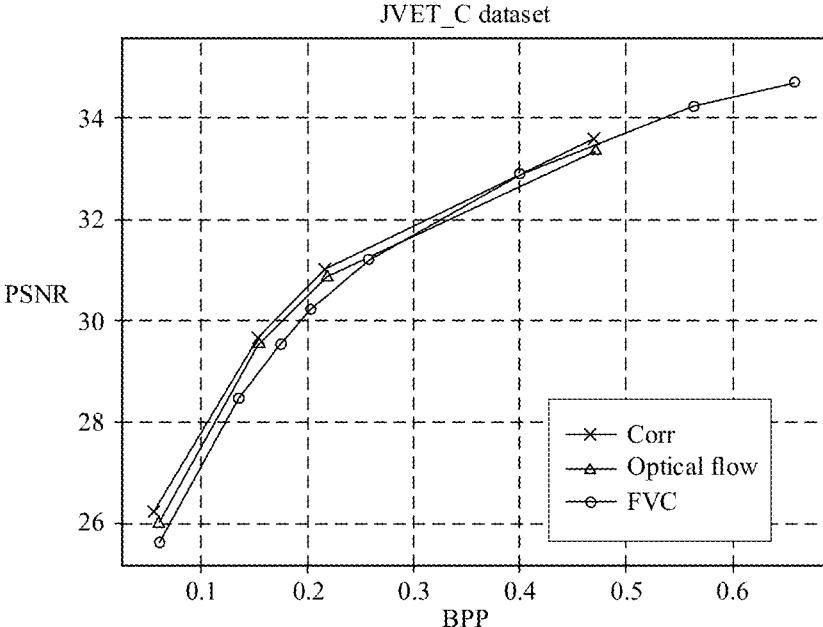
FIG. 13 is a comparison diagram of another coding performance according to an embodiment of this disclosure.
Figure 14:
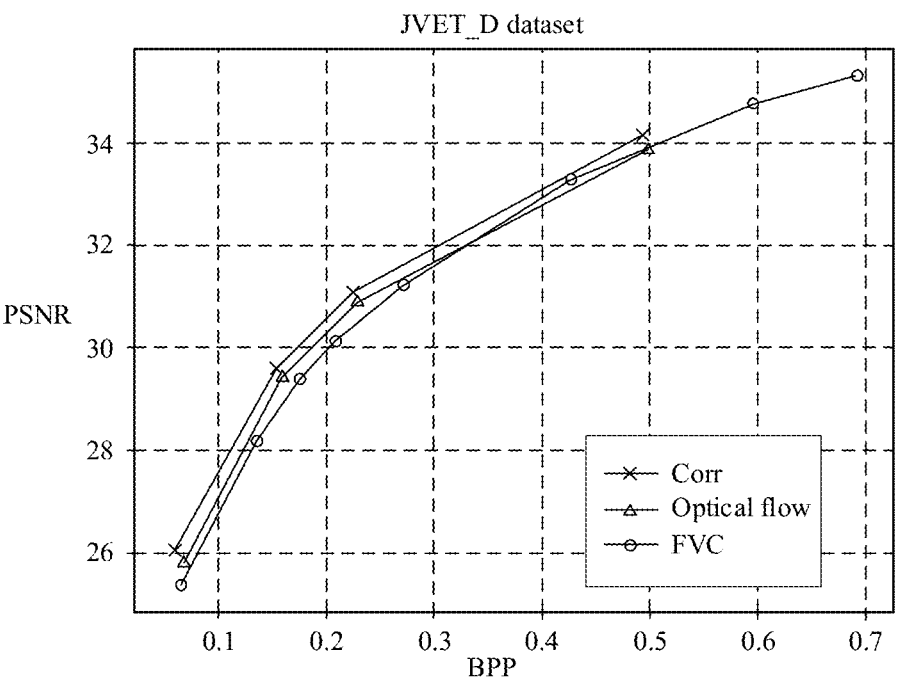
FIG. 14 is a comparison diagram of still another coding performance according to an embodiment of this disclosure.
Figure 15:
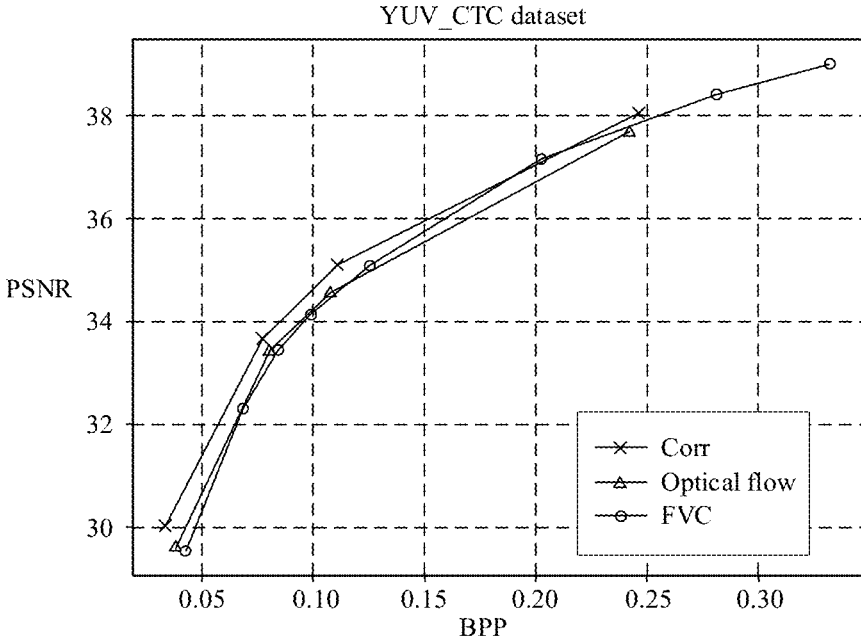
FIG. 15 is a comparison diagram of still another coding performance according to an embodiment of this disclosure.

To verify coding performance of this scheme, in this embodiment of this disclosure, this scheme and two comparison schemes are further tested in a test set. The test set includes a class B video, a class C video, and a class D video in a Joint Video Experts Team (JVET) standard test set, and some videos in a YUV_CTC video set. A resolution of the class B video is 1920*1080, a resolution of the class C video is 832*480, and a resolution of the class D video is 416*240. FIG. 12 to FIG. 15 are comparison diagrams of coding performance according to an embodiment of this disclosure. FIG. 12 to FIG. 14 are respectively test results for the class B video, the class C video, and the class D video, and FIG. 15 is a test result for a video in the YUV_CTC video set. In legends in FIG. 12 to FIG. 15, "Corr" represents this scheme, that is, an inter prediction coding scheme based on a correlation matrix. "Optical flow" in the legends represents a comparison scheme 1, that is, an inter prediction coding scheme based on optical flow estimation. "FVC" in the legends represents a comparison scheme 2, that is, an encoding scheme for obtaining an inter motion feature only based on features of a current frame and a reference frame. A higher performance indicator PSNR indicates better quality of a reconstructed image, and a larger BPP indicates a lower compression rate and lower quality of a reconstructed image. It can be learned that a curve corresponding to this scheme is closer to the top and is closer to the left. This indicates that the coding performance of this scheme is better, that is, compression performance is better.

It can be learned from the foregoing description that this scheme does not depend on an optical flow, so that a calculation amount of calculating the optical flow is reduced, it is easier to predict the inter motion feature, and it is easier to predict an inter motion feature that is more conducive to compression. In this scheme, a correlation matrix is introduced. This helps improve prediction accuracy of the inter motion feature, makes inter prediction and compression simpler, and helps improve a fitting and generalization capability of an entire coding model.

In conclusion, in this embodiment of this disclosure, the correlation matrix is introduced to fit inter motion. Because the correlation matrix can represent a part with strong correlation and a part with weak correlation between a current feature and a reference feature, and inter motion information corresponding to the part with strong correlation is richer, in a process of fitting the inter motion, inter motion corresponding to the part with strong correlation can be better fitted based on a size of each element in the correlation matrix, and less attention is paid to inter motion corresponding to the part with weak correlation. Simply speaking, the correlation matrix has an information enhancement function for prediction of the inter motion feature, that is, can improve prediction accuracy of the inter motion feature and further improve compression performance.

FIG. 16 is a flowchart of a decoding method according to an embodiment of this disclosure. The method is applied to a decoder side. Refer to FIG. 16. The method includes the following steps.

Step 1601: Parse out an inter motion feature and a residual feature from a bitstream.

The inter motion feature encoded into the bitstream is determined based on a correlation matrix of a reference feature relative to a current feature.

Optionally, the decoder side parses out the inter motion feature from the bitstream through entropy decoding. In an implementation, the decoder side parses out the inter motion feature from the bitstream through entropy decoding based on a specified first probability distribution parameter. In another implementation, the decoder side parses out a first hyper-prior feature from the bitstream based on a specified second probability distribution parameter, and inputs the first hyper-prior feature into a hyper decoder network to obtain a first prior feature. The decoder side determines probability distribution parameters of the inter motion feature based on the first prior feature, and parses out the inter motion feature from the bitstream based on the probability distribution parameters of the inter motion feature.

Optionally, the decoder side parses out the residual feature from the bitstream through entropy decoding. In an implementation, the decoder side parses out the residual feature from the bitstream through entropy decoding based on a specified third probability distribution parameter. In another implementation, the decoder side parses out a second hyper-prior feature from the bitstream based on a specified fourth probability distribution parameter, and inputs the second hyper-prior feature into the hyper decoder network to obtain a second prior feature. The decoder side determines probability distribution parameters of the residual feature based on the second prior feature, and parses out the residual feature from the bitstream through entropy decoding based on the probability distribution parameters of the residual feature.

It should be noted that the first probability distribution parameter, the second probability distribution parameter, the third probability distribution parameter, and the fourth probability distribution parameter in a decoding process are the same as those in the encoding process, and the hyper decoder network used in the decoding process is the same as the hyper decoder network used in the encoding process.

Step 1602: Determine a predicted feature of a to-be-decoded current image based on the inter motion feature and the reference feature.

In this embodiment of this disclosure, the decoder side inputs the inter motion feature into a motion decoding network to obtain a reconstructed motion feature between the current image and a reference image. The decoder side transforms the reference feature based on the reconstructed motion feature to obtain the predicted feature of the current image. A specific implementation process is consistent with related content in the encoding process, and details are not described herein again.

Step 1603: Reconstruct the current image based on the predicted feature and the residual feature.

In this embodiment of this disclosure, the decoder side obtains a reconstructed feature of the current image based on the residual feature and the predicted feature. The decoder side inputs the reconstructed feature of the current image into an image reconstruction network to reconstruct the current image, that is, obtain a reconstructed image of a current frame. The decoder side may input the residual feature into a residual decoding network to obtain a reconstructed residual, and obtain the reconstructed feature of the current image based on the predicted feature and the reconstructed residual. A specific implementation process is consistent with related content in the embodiment in FIG. 9, and details are not described herein again.

In a decoding process of another embodiment, the foregoing step 1602 and step 1603 are replaced with: determining a predicted image of a to-be-decoded current image based on the inter motion feature and a reference image, and reconstructing a current feature based on the predicted image and the residual feature. The decoder side may input the inter motion feature into the motion decoding network to obtain the reconstructed motion feature. The decoder side transforms the reference image based on the reconstructed motion feature to obtain the predicted image of the current image. The decoder side may input the residual feature into the residual decoding network to obtain the reconstructed residual, and reconstruct the current image based on the predicted image and the reconstructed residual.

In a decoding process of still another embodiment, the decoder side parses out the inter motion feature and a residual from the bitstream, and inputs the inter motion feature into the motion decoding network to obtain the reconstructed motion feature between the current image and the reference image. The decoder side transforms the reference feature based on the reconstructed motion feature to obtain the predicted feature of the current image. The decoder side obtains the reconstructed feature of the current image based on the predicted feature and the parsed-out residual, and inputs the reconstructed feature of the current image into the image reconstruction network to reconstruct the current image.

In a decoding process of still another embodiment, the decoder side parses out the inter motion feature and a residual from the bitstream, and inputs the inter motion feature into the motion decoding network to obtain the reconstructed motion feature between the current image and the reference image. The decoder side transforms the reference image based on the reconstructed motion feature to obtain the predicted image of the current image. The decoder side reconstructs the current image based on the predicted image and the parsed-out residual.

It should be noted that, it can be learned from the foregoing description that this scheme can be applied to both a P frame and a B frame. For the P frame, the decoder side parses out one inter motion feature and one residual feature from the bitstream to decode the P frame. For the B frame, the current image corresponds to two reference images. In an implementation, the decoder side parses out two inter motion features and two residual features from the bitstream.

The decoder side obtains two predicted features based on the two inter motion features, obtains two reconstructed images of the current frame based on the two residual features and the two predicted features, and fuses the two reconstructed images to reconstruct the current image. In another implementation, the decoder side parses out two inter motion features and one residual feature from the bitstream. The decoder side obtains two predicted features based on the two inter motion features, fuses the two predicted features to obtain one fused predicted feature, and reconstructs the current image based on the fused predicted feature and the residual feature.

It should be further noted that the decoding process in any one of the foregoing embodiments matches the encoding process. For example, if the encoding process is to perform transformation and prediction in image space, the decoding process is also to perform transformation and prediction in the image space. If the encoding process is to perform transformation and prediction in feature space, the decoding process is also to perform transformation and prediction in the feature space.

In conclusion, in the encoding process in this embodiment of this disclosure, the correlation matrix is introduced to fit inter motion. The correlation matrix has an information enhancement function for prediction of the inter motion feature, that is, can improve prediction accuracy of the inter motion feature and further improve compression performance.

FIG. 17 is a diagram of a structure of an encoding apparatus 1700 according to an embodiment of this disclosure. The encoding apparatus 1700 may be implemented as a part or an entirety of a computer device by using software, hardware, or a combination of software and hardware. The computer device may include any encoder side in the foregoing embodiments. Refer to FIG. 17. The apparatus 1700 includes: a first determining module 1701, a second determining module 1702, a third determining module 1703, and a first encoding module 1704.

The first determining module 1701 is configured to determine a current feature and a reference feature, where the current feature is a feature of a to-be-encoded current image, and the reference feature is a feature of a reference image of the current image.

The second determining module 1702 is configured to determine a correlation matrix of the reference feature relative to the current feature.

The third determining module 1703 is configured to determine an inter motion feature based on the correlation matrix.

The first encoding module 1704 is configured to encode the inter motion feature into a bitstream.

Optionally, the third determining module 1703 is configured to: input the correlation matrix into a motion encoding network to obtain the inter motion feature; or input the correlation matrix, the current feature, and the reference feature into a motion encoding network to obtain the inter motion feature; or input the correlation matrix, the current image, and the reference image into a motion encoding network to obtain the inter motion feature.

Optionally, the third determining module 1703 is configured to: use the reference feature as a predicted feature, and input the correlation matrix, the predicted feature, and the current feature into the motion encoding network to obtain a motion feature; determine a quantity of iterations; if the quantity of iterations is less than an iteration quantity threshold, input the motion feature into a motion decoding network to obtain a reconstructed motion feature, transform the reference feature based on the reconstructed motion feature to re-determine the predicted feature, re-determine a correlation matrix of the predicted feature relative to the current feature, and return to perform the step of inputting the correlation matrix, the predicted feature, and the current feature into the motion encoding network to obtain a motion feature; and if the quantity of iterations is equal to the iteration quantity threshold, determine the motion feature as the inter motion feature.

Optionally, the apparatus 1700 further includes: a fourth determining module, configured to determine a residual feature based on the inter motion feature; and a second encoding module, configured to encode the residual feature into the bitstream.

Optionally, the fourth determining module is configured to: input the inter motion feature into the motion decoding network to obtain the reconstructed motion feature between the current image and the reference image; transform the reference feature based on the reconstructed motion feature between the current image and the reference image to obtain the predicted feature of the current image; determine a first residual, where the first residual is a residual between the predicted feature of the current image and the current feature; and input the first residual into a residual encoding network to obtain the residual feature.

Optionally, the fourth determining module is configured to: input the inter motion feature into the motion decoding network to obtain the reconstructed motion feature between the current image and the reference image; transform the reference image based on the reconstructed motion feature between the current image and the reference image to obtain a predicted image; determine a second residual, where the second residual is a residual between the predicted image and the current image; and input the second residual into a residual encoding network to obtain the residual feature.

Optionally, the reference image is a reconstructed image of a reference frame.

In this embodiment of this disclosure, the correlation matrix is introduced to fit inter motion. Because the correlation matrix can represent a part with strong correlation and a part with weak correlation between the current feature and the reference feature, and inter motion information corresponding to the part with strong correlation is richer, in a process of fitting the inter motion, inter motion corresponding to the part with strong correlation can be better fitted based on a size of each element in the correlation matrix, and less attention is paid to inter motion corresponding to the part with weak correlation. Simply speaking, the correlation matrix has an information enhancement function for prediction of the inter motion feature, that is, can improve prediction accuracy of the inter motion feature and further improve compression performance.

It should be noted that, when the encoding apparatus provided in the foregoing embodiment performs video coding, division into the foregoing functional modules is merely used as an example for description. During actual application, the foregoing functions may be allocated to different functional modules for implementation according to a requirement. In other words, an internal structure of the apparatus is divided into different functional modules to implement all or some of the functions described above. In addition, the encoding apparatus provided in the foregoing embodiment and the encoding method embodiment belong to a same concept. For a specific implementation process of the encoding apparatus, refer to the method embodiment for details. Details are not described herein again.

Figure 18:
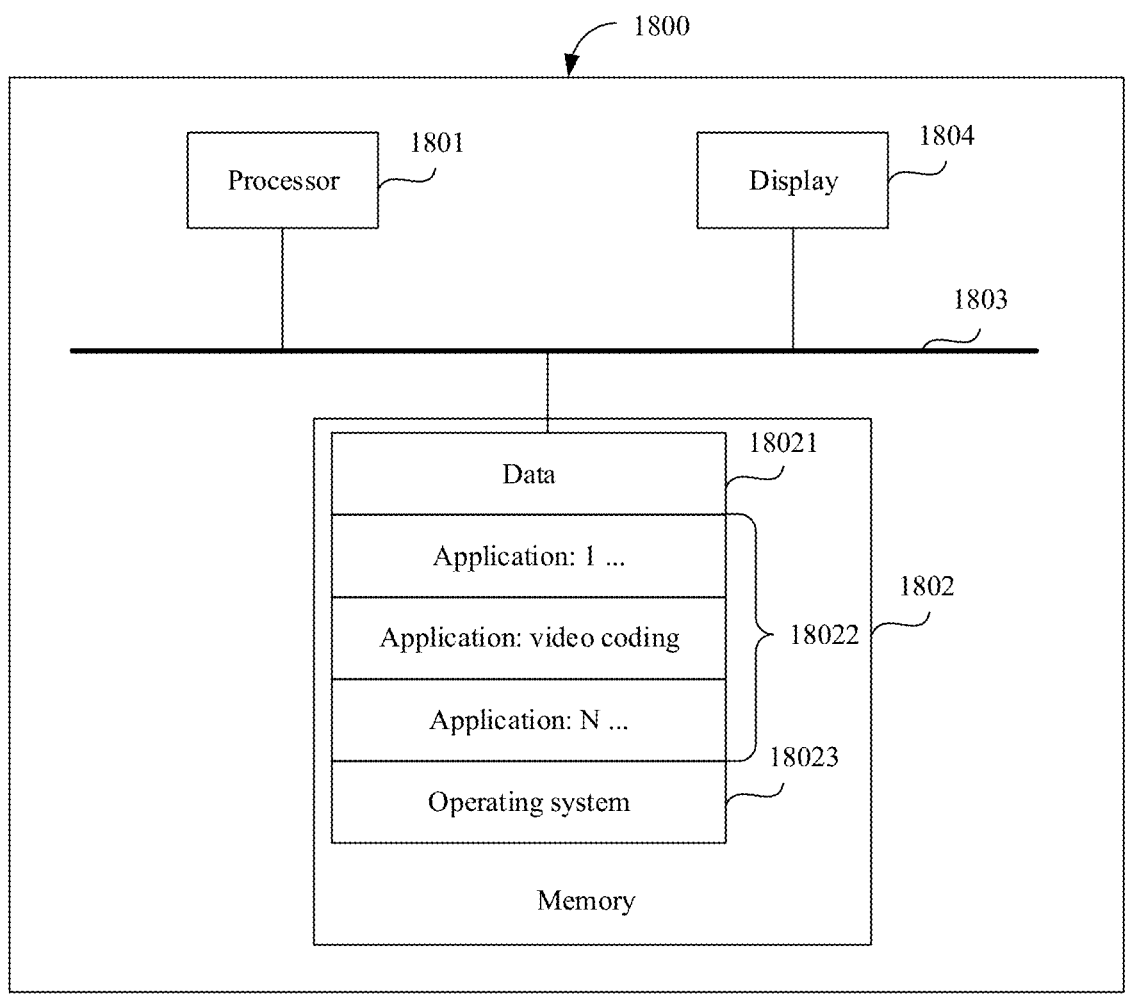
FIG. 18 is a block diagram of a coding apparatus according to an embodiment of this disclosure.

FIG. 18 is a block diagram of a coding apparatus 1800 according to an embodiment of this disclosure. The coding apparatus 1800 may include a processor 1801, a memory 1802, and a bus system 1803. The processor 1801 and the memory 1802 are connected through the bus system 1803. The memory 1802 is configured to store instructions. The processor 1801 is configured to execute the instructions stored in the memory 1802, to perform the encoding or decoding method described in embodiments of this disclosure. To avoid repetition, details are not described herein again.

In this embodiment of this disclosure, the processor 1801 may be a CPU, or the processor 1801 may be another general-purpose processor, a DSP, an ASIC, an FPGA or another programmable logic device, a discrete gate or a transistor logic device, a discrete hardware component, or the like. The general-purpose processor may be a microprocessor, or the processor may be any other processor or the like.

The memory 1802 may include a ROM device or a RAM device. Any another suitable type of storage device may also be used as the memory 1802. The memory 1802 may include code and data 18021 accessed by the processor 1801 through a bus 1803. The memory 1802 may further include an operating system 18023 and an application 18022. The application 18022 includes at least one program that allows the processor 1801 to perform the encoding or decoding method described in embodiments of this disclosure. For example, the application 18022 may include applications 1 to N, and further include an encoding or decoding application (referred to as a coding application for short) for performing the encoding or decoding method described in embodiments of this disclosure.

In addition to a data bus, the bus system 1803 may further include a power bus, a control bus, a status signal bus, and the like. However, for clear description, various types of buses in the figure are marked as the bus system 1803.

Optionally, the coding apparatus 1800 may further include one or more output devices, such as a display 1804. In an example, the display 1804 may be a touch-sensitive display that combines a display with a touch-sensitive unit that is operable to sense a touch input. The display 1804 may be connected to the processor 1801 through the bus 1803.

It should be noted that the coding apparatus 1800 may perform the encoding method in embodiments of this disclosure or the decoding method in embodiments of this disclosure.

A person skilled in the art can understand that functions described with reference to various illustrative logical blocks, modules, and algorithm steps disclosed and described in this specification may be implemented by hardware, software, firmware, or any combination thereof. If the functions are implemented by software, the functions described with reference to the various illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium such as a data storage medium, or may include any communication medium that facilitates transmission of a computer program from one place to another place (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this disclosure. A computer program product may include a computer-readable medium.

By way of example and not limitation, such a computer-readable storage medium may include a RAM, a ROM, an EEPROM, a CD-ROM or another optical disc storage apparatus, a magnetic disk storage apparatus or another magnetic storage apparatus, a flash memory, or any other medium that may be configured to store required program code in a form of instructions or data structures and that can be accessed by a computer. In addition, any connection is properly referred to as a computer-readable medium. For example, if instructions are transmitted from a website, a server, or another remote source through a coaxial cable, an optical fiber, a twisted pair, a DSL, or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but are actually non-transitory tangible storage media. Disks and discs used in this specification include a compact disc (CD), a laser disc, an optical disc, a DVD, and a BLU-RAY disc. The disks usually reproduce data magnetically, and the discs reproduce data optically by using lasers. Combinations of the foregoing items should also be included in the scope of the computer-readable medium.

Instructions may be executed by one or more processors such as one or more DSPs, a general-purpose microprocessor, an ASIC, an FPGA, or another equivalent integrated circuit or discrete logic circuit. Therefore, the term "processor" used in this specification may refer to the foregoing structure or any other structure suitable for implementing technologies described in this specification. In addition, in some aspects, the functions described with reference to the various illustrative logical blocks, modules, and steps described in this specification may be provided in dedicated hardware and/or software modules configured for encoding and decoding, or may be integrated into a combined codec. In addition, the technologies may be completely implemented in one or more circuits or logic elements. In an example, various illustrative logic blocks, units, and modules in an encoder 100 and a decoder 200 may be understood as corresponding circuit devices or logic elements.

Technologies in embodiments of this disclosure may be implemented in various apparatuses or devices, including a wireless handset, an integrated circuit (IC), or a set of ICs (for example, a chip set). Various components, modules, or units are described in embodiments of this disclosure to emphasize functional aspects of apparatuses configured to perform disclosed technologies, but do not necessarily need to be implemented by different hardware units. Actually, as described above, various units may be combined into a codec hardware unit in combination with appropriate software and/or firmware, or may be provided by an interoperable hardware unit (including one or more processors described above).

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer instructions are loaded and executed on a computer, a procedure or functions according to embodiments of this disclosure are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. It should be noted that the computer-readable storage medium mentioned in embodiments of this disclosure may be a non-volatile storage medium, in other words, may be a non-transitory storage medium.

It should be understood that "at least one" mentioned in this specification means one or more, and "a plurality of" means to two or more. In the descriptions of embodiments of this disclosure, "/" means "or" unless otherwise specified. For example, A/B may represent A or B. The term "and/or" in this specification describes only an association relationship between associated objects and represents that three relationships may exist. For example, A and/or B may represent the following three cases: only A exists, both A and B exist, and only B exists. In addition, to clearly describe the technical solutions in embodiments of this disclosure, terms such as "first" and "second" are used in embodiments of this disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that information (including but not limited to user equipment information, personal information of a user, and the like), data (including but not limited to data used for analysis, stored data, displayed data, and the like), and signals in embodiments of this disclosure are used under authorization by the user or full authorization by all parties, and capturing, using, and processing of related data need to conform to related laws, regulations, and standards of related countries and regions. For example, videos, images, and the like related in embodiments of this disclosure are obtained under full authorization.

The foregoing descriptions are merely example embodiments of this disclosure, but are not intended to limit this disclosure. Any modification, equivalent replacement, or improvement made without departing from the spirit and principle of this disclosure should fall within the protection scope of this disclosure.

What is claimed is:

1. A method, comprising:
   determining a current feature and a reference feature, wherein the current feature is of a to-be-encoded current image, and wherein the reference feature is of a reference image of the to-be-encoded current image;

determining a correlation matrix of the reference feature relative to the current feature;
   determining, based on the correlation matrix, an inter motion feature;
   determining, based on the inter motion feature, a residual feature; and
   encoding the inter motion feature and the residual feature into a bitstream.

2. The method of claim 1, wherein determining the inter motion feature comprises inputting the correlation matrix into a first motion encoding network to obtain the inter motion feature.

3. The method of claim 1, wherein determining the inter motion feature comprises:
   using the reference feature as a predicted feature;
   inputting the correlation matrix, the predicted feature, and the current feature into a motion encoding network to obtain a motion feature;
   determining a quantity of iterations of obtaining the motion feature;
   when the quantity of iterations is less than an iteration quantity threshold:
      inputting the motion feature into a motion decoding network to obtain a reconstructed motion feature;
      transforming, based on the reconstructed motion feature, the reference feature to re-determine the predicted feature;
      re-determining the correlation matrix relative to the current feature; and
      returning to perform the step of inputting the correlation matrix, the predicted feature, and the current feature into the motion encoding network to obtain the motion feature; and
   when the quantity of iterations is equal to the iteration quantity threshold, determining the motion feature as the inter motion feature.

4. The method of claim 1, wherein determining the residual feature comprises:
   inputting the inter motion feature into the motion decoding network to obtain a reconstructed motion feature between the to-be-encoded current image and the reference image;
   transforming, based on the reconstructed motion feature, the reference feature to obtain a predicted feature of the current image;
   determining a first residual that is between the predicted feature and the current feature; and
   inputting the first residual into a residual encoding network to obtain the residual feature.

5. The method of claim 1, wherein determining the residual feature comprises:
   inputting the inter motion feature into the motion decoding network to obtain a reconstructed motion feature between the to-be-encoded current image and the reference image;
   transforming, based on the reconstructed motion feature, the reference image to obtain a predicted image;
   determining a second residual that is between the predicted image and the to-be-encoded current image; and
   inputting the second residual into a residual encoding network to obtain the residual feature.

6. The method of claim 1, wherein the reference image is a reconstructed image of a reference frame.

7. The method of claim 1, wherein determining the inter motion feature comprises inputting the correlation matrix, the current feature, and the reference feature into a second motion encoding network to obtain the inter motion feature.

8. The method of claim 1, wherein determining the inter motion feature comprises inputting the correlation matrix, the to-be-encoded current image, and the reference image into a third motion encoding network to obtain the inter motion feature.

9. An apparatus, comprising:
a memory configured to store instructions; and
one or more processors coupled to the memory and configured to execute the instructions to:
determine a current feature and a reference feature, wherein the current feature is of a to-be-encoded current image, and wherein the reference feature is of a reference image of the to-be-encoded current image;
determine a correlation matrix of the reference feature relative to the current feature;
determine, based on the correlation matrix, an inter motion feature;
determine, based on the inter motion feature, a residual feature; and
encode the inter motion feature and the residual feature into a bitstream.

10. The apparatus of claim 9, wherein the one or more processors are further configured to execute the instructions to input the correlation matrix into a first motion encoding network to obtain the inter motion feature.

11. The apparatus of claim 9, wherein the one or more processors are further configured to execute the instructions to:
use the reference feature as a predicted feature;
input the correlation matrix, the predicted feature, and the current feature into a motion encoding network to obtain a motion feature;
determine a quantity of iterations of obtaining the motion feature;
when the quantity of iterations is less than an iteration quantity threshold:
input the motion feature into a motion decoding network to obtain a reconstructed motion feature;
transform, based on the reconstructed motion feature, the reference feature to re-determine the predicted feature;
re-determine the correlation matrix to the current feature; and
return to perform the step of inputting the correlation matrix, the predicted feature, and the current feature into the motion encoding network to obtain the motion feature; and
when the quantity of iterations is equal to the iteration quantity threshold, determine the motion feature as the inter motion feature.

12. The apparatus of claim 9, wherein the one or more processors are further configured to execute the instructions to:
input the inter motion feature into the motion decoding network to obtain a reconstructed motion feature between the to-be-encoded current image and the reference image;
transform, based on the reconstructed motion feature, the reference feature to obtain a predicted feature of the current image;
determine a first residual that is between the predicted feature and the current feature; and
input the first residual into a residual encoding network to obtain the residual feature.

13. The apparatus of claim 9, wherein the one or more processors are further configured to execute the instructions to:
input the inter motion feature into the motion decoding network to obtain a reconstructed motion feature between the to-be-encoded current image and the reference image;
transform, based on the reconstructed motion feature, the reference image to obtain a predicted image;
determine a second residual that is between the predicted image and the to-be-encoded current image; and
input the second residual into a residual encoding network to obtain the residual feature.

14. The apparatus of claim 9, wherein the reference image is a reconstructed image of a reference frame.

15. The apparatus of claim 9, wherein the one or more processors are further configured to execute the instructions to:
input the correlation matrix, the current feature, and the reference feature into a second motion encoding network to obtain the inter motion feature; or
input the correlation matrix, the to-be-encoded current image, and the reference image into a third motion encoding network to obtain the inter motion feature.

16. A computer program product comprising instructions that are stored on a non-transitory computer-readable storage medium and that, when executed by one or more processors, cause an apparatus to:
determine a current feature and a reference feature, wherein the current feature is of a to-be-encoded current image, and wherein the reference feature is of a reference image of the to-be-encoded current image;
determine a correlation matrix of the reference feature relative to the current feature;
determine, based on the correlation matrix, an inter motion feature;
determine, based on the inter motion feature, a residual feature; and
encode the inter motion feature and the residual feature into a bitstream.

17. The computer program product of claim 16, wherein the one or more processors are further configured to execute the instructions to:
input the correlation matrix into a first motion encoding network to obtain the inter motion feature;
input the correlation matrix, the current feature, and the reference feature into a second motion encoding network to obtain the inter motion feature; or
input the correlation matrix, the to-be-encoded current image, and the reference image into a third motion encoding network to obtain the inter motion feature.

18. The computer program product of claim 16, wherein the one or more processors are further configured to execute the instructions to:
use the reference feature as a predicted feature;
input the correlation matrix, the predicted feature, and the current feature into a motion encoding network to obtain a motion feature;
determine a quantity of iterations of obtaining the motion features;
when the quantity of iterations is less than an iteration quantity threshold:
input the motion feature into a motion decoding network to obtain a reconstructed motion feature;
transform, based on the reconstructed motion feature, the reference feature to re-determine the predicted feature;

re-determine the correlation matrix to the current feature; and return to perform the step of inputting the correlation matrix, the predicted feature, and the current feature into the motion encoding network to obtain the motion feature; and when the quantity of iterations is equal to the iteration quantity threshold, determine the motion feature as the inter motion feature.

19. The computer program product of claim 16, wherein the one or more processors are further configured to execute the instructions to:

input the inter motion feature into the motion decoding network to obtain a reconstructed motion feature between the to-be-encoded current image and the reference image;

transform, based on the reconstructed motion feature, the reference feature to obtain a predicted feature of the to-be-encoded current image;

determine a first residual that is between the predicted feature and the current feature; and input the first residual into a residual encoding network to obtain the residual feature.

20. The computer program product of claim 16, wherein the one or more processors are further configured to execute the instructions to:

input the inter motion feature into the motion decoding network to obtain a reconstructed motion feature between the to-be-encoded current image and the reference image;

transform, based on the reconstructed motion feature, the reference image to obtain a predicted image;

determine a second residual that is between the predicted image and the to-be-encoded current image; and input the second residual into a residual encoding network to obtain the residual feature.

\*  \*  \*  \*  \*